(12) United States Patent
Pan et al.

(10) Patent No.: US 12,204,586 B2
(45) Date of Patent: Jan. 21, 2025

(54) OBJECT MANAGEMENT METHOD AND APPARATUS, DEVICE, STORAGE MEDIUM, AND SYSTEM

(71) Applicant: TENCENT TECHNOLOGY (SHENZHEN) COMPANY LIMITED, Shenzhen (CN)

(72) Inventors: Yong Pan, Shenzhen (CN); Longwei Lai, Shenzhen (CN); Yachang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/316,063

(22) Filed: May 11, 2023

(65) Prior Publication Data

US 2023/0281251 A1    Sep. 7, 2023

Related U.S. Application Data

(63) Continuation of application No. PCT/CN2022/111471, filed on Aug. 10, 2022.

(30) Foreign Application Priority Data

Sep. 9, 2021 (CN) .......................... 202111057914.8

(51) Int. Cl.
*G06F 7/00* (2006.01)
*G06F 16/901* (2019.01)
(Continued)

(52) U.S. Cl.
CPC ............ *G06F 16/9027* (2019.01); *G06T 7/11* (2017.01); *G06T 7/70* (2017.01); *G06V 10/761* (2022.01)

(58) Field of Classification Search
CPC ...... G06F 16/9027; G06F 16/903; G06T 7/11; G06T 7/70; G06T 17/005; G06V 10/25;
(Continued)

(56) References Cited

U.S. PATENT DOCUMENTS 5,533,148 A * 7/1996 Sayah ................... G06F 30/398
716/139
5,987,468 A * 11/1999 Singh .................. G06F 16/2246
(Continued)

FOREIGN PATENT DOCUMENTS

| CN | 110716766 A | 1/2020 |
| CN | 111467806 A | 7/2020 |

(Continued)

OTHER PUBLICATIONS

The World Intellectual Property Organization (WIPO) International Search Report for PCT/CN2022/111471 Nov. 8, 2022 13 Pages (including translation).

(Continued)

*Primary Examiner* — Mohammed R Uddin
(74) *Attorney, Agent, or Firm* — ANOVA LAW GROUP PLLC

(57) ABSTRACT

An object management method includes: obtaining position information of a first object added in a scene; determining, from an object management tree corresponding to the scene, a first node according to the position information of the first object; dividing, in response to that a quantity of objects contained in the area corresponding to the first node is greater than an upper limit after the first object is added to the area corresponding to the first node, the area corresponding to the first node into n sub-areas according to position information of objects contained in the area corresponding (Continued)

to the first node; and configuring, in the object management tree, n nodes in one-to-one correspondence with the n sub-areas.

20 Claims, 12 Drawing Sheets

(51) Int. Cl.
 *G06T 7/11* (2017.01)
 *G06T 7/70* (2017.01)
 *G06V 10/74* (2022.01)
(58) Field of Classification Search
 CPC ... G06V 10/761; A63F 13/55; A63F 13/5372; A63F 13/52
 See application file for complete search history.

(56) References Cited

U.S. PATENT DOCUMENTS

| | | | | |
|---|---|---|---|---|
| 5,990,896 | A * | 11/1999 | Barrus | G06T 15/10 345/420 |
| 6,137,493 | A * | 10/2000 | Kamimura | G06F 16/2264 707/E17.012 |
| 7,439,970 | B1 * | 10/2008 | Clarke | G06T 17/005 345/428 |
| 8,400,447 | B1 * | 3/2013 | Carr | G06T 15/06 345/419 |
| 8,467,443 | B2 * | 6/2013 | Lee | G11B 27/031 375/240.12 |
| 8,941,666 | B1 * | 1/2015 | Kovar | G06F 8/30 345/473 |
| 2003/0058238 | A1 * | 3/2003 | Doak | A63F 13/45 709/217 |
| 2003/0227455 | A1 * | 12/2003 | Lake | G06T 17/005 345/421 |
| 2006/0053163 | A1 * | 3/2006 | Liu | H04L 67/131 |
| 2008/0192044 | A1 * | 8/2008 | Fowler | G06T 15/06 345/419 |
| 2008/0192054 | A1 * | 8/2008 | Fowler | G06T 15/06 345/427 |
| 2008/0238919 | A1 | 10/2008 | Pack | |
| 2008/0259075 | A1 * | 10/2008 | Fowler | G06T 15/06 345/421 |
| 2009/0043816 | A1 * | 2/2009 | Youm | G11B 27/034 |
| 2009/0167763 | A1 * | 7/2009 | Waechter | G06T 15/40 345/426 |
| 2009/0247251 | A1 * | 10/2009 | Ito | A63F 13/422 463/9 |
| 2013/0135304 | A1 * | 5/2013 | Chen | G06T 19/20 345/420 |
| 2015/0279085 | A1 | 10/2015 | Dell | |
| 2017/0270146 | A1 * | 9/2017 | Harrison | G06F 7/14 |
| 2018/0204361 | A1 * | 7/2018 | Tinsman | A63F 13/65 |
| 2019/0295317 | A1 * | 9/2019 | Baillie | G06T 11/00 |
| 2020/0122037 | A1 * | 4/2020 | Kakizawa | A63F 13/56 |
| 2020/0289937 | A1 * | 9/2020 | Osman | A63F 13/47 |
| 2020/0310884 | A1 * | 10/2020 | Villalobos | G06F 16/909 |
| 2020/0311142 | A1 * | 10/2020 | Edelman | G06F 16/9027 |
| 2021/0021419 | A1 | 1/2021 | Guo et al. | |
| 2021/0133929 | A1 * | 5/2021 | Ackerson | G06T 9/001 |
| 2021/0142108 | A1 | 5/2021 | Huang et al. | |
| 2022/0114787 | A1 * | 4/2022 | Loodin Ek | G06T 17/005 |
| 2022/0292543 | A1 * | 9/2022 | Henderson | G06Q 30/0252 |
| 2023/0281251 | A1 * | 9/2023 | Pan | G06T 7/70 |
| 2024/0078255 | A1 * | 3/2024 | Li | G06F 16/29 |

FOREIGN PATENT DOCUMENTS

| | | |
|---|---|---|
| CN | 113713381 A | 11/2021 |
| JP | 2015535978 A | 12/2015 |
| WO | 2020048436 A1 | 3/2020 |
| WO | 2020098606 A1 | 5/2020 |

OTHER PUBLICATIONS

The European Patent Office (EPO) The Extended European Search Report for Application No. 22866314.2 Sep. 10, 2024 13 Pages.
Foley et al., "Computer Graphics: Principles and Practise—Third Edition", Jul. 1, 2023 (Jul. 1, 2013), pp. 334, 635-668, 1065-1101.
Anonymous: "Octree", Wikipedia, Oct. 7, 2020 (Oct. 7, 2020), https://en.wikipedia.org/w/index.php? title=Octree&oldid= 774135880.
The Japan Patent Office (JPO) Notice of Reasons for Refusal for Application No. 2023-549040 Oct. 8, 2024 17 Pages (including translation).

* cited by examiner

OBJECT MANAGEMENT METHOD AND APPARATUS, DEVICE, STORAGE MEDIUM, AND SYSTEM

CROSS-REFERENCES TO RELATED APPLICATIONS

This application is a continuation application of PCT Patent Application No. PCT/CN2022/111471, entitled "OBJECT MANAGEMENT METHOD, APPARATUS AND SYSTEM, AND DEVICE AND STORAGE MEDIUM" and filed on Aug. 10, 2022, which claims priority to China Patent Application No. 202111057914.8, entitled "OBJECT MANAGEMENT METHOD AND APPARATUS, DEVICE, STORAGE MEDIUM, AND SYSTEM" and filed on Sep. 9, 2021, the entire contents of both of which are incorporated herein by reference.

FIELD OF THE TECHNOLOGY

Embodiments of the present disclosure relate to the field of computer and Internet technologies, and in particular, to an object management method and apparatus, a device, a storage medium, and a system.

BACKGROUND OF THE DISCLOSURE

In applications such as games, due to a large quantity of objects in a scene, the objects in the scene need to be managed effectively, so as to facilitate selection of objects within a field of view and acquisition of related data.

In the related art, provided is a solution for managing objects in a scene by using a tree structure. A node in the tree corresponds to an area in the scene. When an area corresponding to a certain node satisfies a splitting condition, the area corresponding the node is directly split into n sub-areas having the same size, n child nodes of the node are added to the tree, and each child node manages 1/n of the area and data of a parent node.

However, under such an operation, the quantity of nodes increases too quickly and occupies a lot of internal memory.

SUMMARY

Embodiments of the present disclosure provide an object management method and apparatus, a device, a storage medium, and a system. The technical solutions are as follows.

According to an aspect of the embodiments of the present disclosure, provided is an object management method, executed by a computer device and including: obtaining position information of a first object added in a scene; determining, from an object management tree corresponding to the scene, a first node based on the position information of the first object; the object management tree including a plurality of nodes, each node corresponding to an area in the scene, where areas corresponding to different nodes do not overlap, and the first node corresponds to an area to which the position information of the first object belongs;
dividing, in response to that a quantity of objects contained in the area corresponding to the first node is greater than an upper limit after the first object is added to the area corresponding to the first node, the area corresponding to the first node into n sub-areas according to position information of the objects contained in the area corresponding to the first node, n being an integer greater than 1; and configuring, in the object management tree, n nodes in one-to-one correspondence with the n sub-areas.

According to an aspect of the embodiments of the present disclosure, provided is an object management apparatus, including: a position obtaining module, configured to obtain position information of a first object added in a scene; a node determining module, configured to determine, from an object management tree corresponding to the scene, a first node based on the position information of the first object; the object management tree including a plurality of nodes, each node corresponding to an area in the scene, where areas corresponding to different nodes do not overlap, and the first node corresponds to an area to which the position information of the first object belongs; an area division module, configured to divide, in response to that a quantity of objects contained in the area corresponding to the first node is greater than an upper limit after the first object is added to the area corresponding to the first node, the area corresponding to the first node into n sub-areas according to position information of the objects contained in the area corresponding to the first node, n being an integer greater than 1; and a node configuration module, configured to configure, in the object management tree, n nodes in one-to-one correspondence with the n sub-areas.

According to an aspect of the embodiments of the present disclosure, provided is a computer device, including at least one processor and at least one memory, the memory storing a computer program, and the computer program being loaded and executed by the at least one processor to implement the object management method.

According to an aspect of the embodiments of the present disclosure, provided is a non-transitory computer-readable storage medium, storing a computer program, the computer program being loaded and executed by at least one processor to implement the object management method.

According to an aspect of the embodiments of the present disclosure, provided is an object management system, including: an object management layer and an area of interest (AOI) field of view layer; the AOI field of view layer being configured to transmit field of view data of a target object in a scene to the object management layer, the field of view data of the target object being used for indicating a field of view of the target object; the object management layer being configured to determine the field of view of the target object according to the field of view data of the target object; determine, based on an object management tree corresponding to the scene, a set of objects located within the field of view of the target object, the set of objects including at least one object within the field of view of the target object, the object management tree including a plurality of nodes, each node corresponding to an area in the scene, where areas corresponding to different nodes do not overlap, and the quantity of objects contained in the areas corresponding to the different nodes are the same or close; and transmit object set data to the AOI field of view layer, the object set data being used for indicating the set of objects within the field of view of the target object; and the AOI field of view layer being configured to determine the set of objects within the field of view of the target object according to the object set data.

The technical solutions provided in the embodiments of the present disclosure may bring the following beneficial effects.

When excessive objects are present in a certain area of the scene and need to be split, the area is divided into a plurality of sub-areas according to the distribution position of objects contained in the area, and the quantity of objects contained in the sub-areas is as equal as possible. That is, the space sizes of the sub-areas are not the same, but the quantity of the objects managed in the sub-areas is relatively uniform, so that the quantity of nodes can be prevented from increasing too quickly, internal memory occupation is reduced, and the quantity of objects managed in a certain area may be directly divided into n equal parts to improve the efficiency of object management.

DESCRIPTION OF EMBODIMENTS

To make the objectives, technical solutions, and advantages of the present disclosure clearer, the following further describes implementations of the present disclosure in detail with reference to the accompanying drawings.

Figure 1:
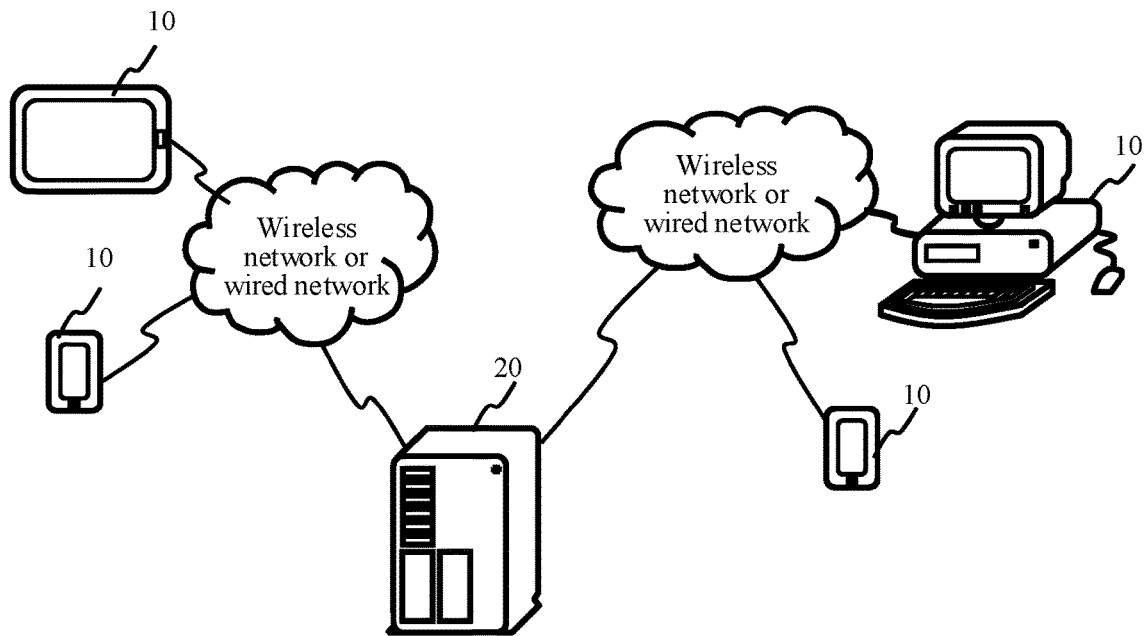
FIG. 1 is a schematic diagram of a solution implementation environment according to an embodiment of the present disclosure.

With reference to FIG. 1, FIG. 1 illustrates a schematic diagram of a solution implementation environment according to an embodiment of the present disclosure. The solution implementation environment may include: a terminal device 10 and a server 20.

The terminal device 10 may be electronic devices such as a mobile phone, a tablet computer, a personal computer (PC), a wearable device, a virtual reality (VR) device, and an augmented reality (AR) device. This is not limited in the present disclosure. A client running a target application may be installed in the terminal device 10. For example, the target application may be a game application, a three-dimensional map program, a social application, an interactive entertainment application, or the like. This is not limited in the present disclosure.

The server 20 may be a server, a server cluster including a plurality of servers, or a cloud computing service center. The server 20 may be a background server of the target application, and the background server is configured to provide a background service for the client of the target application.

The terminal device 10 may communicate with the server 20 through a network.

In some embodiments, the target application may provide a scene, objects are present in the scene, and the objects may perform activities in the scene, such as moving or executing various other operations.

Taking the game application as an example, the scene may be referred to as a virtual scene, and the objects may also be referred to as virtual objects.

The virtual scene is a scene displayed (or provided) by the client of the target application (e.g., the game application) when running on the terminal device, and the virtual scene refers to a scene created for the virtual objects to perform activities (e.g., game competition), such as a virtual house, a virtual island, and a virtual map. The virtual scene may be a simulation scene for the real world, a semi-simulation and semi-fictional scene, or a purely fictional scene. The virtual scene may be a two-dimensional virtual scene, a 2.5-dimensional virtual scene, or a three-dimensional virtual scene. This is not limited in the embodiments of the present disclosure. When the client of the target application runs on the terminal device, different virtual scenes may be displayed (or provided) in different time periods.

The virtual objects refer to virtual characters that perform activities in the virtual scene. Taking the target application being a game application as an example, the virtual objects may be virtual objects controlled by users, or virtual objects controlled by the game application itself, such as virtual objects controlled through artificial intelligence (AI). The virtual objects may be in the form of humans or in the form of animals, cartoons or others. This is not limited in the embodiments of the present disclosure. The virtual objects may be displayed in three-dimensional form or in two-dimensional form. This is not limited in the embodiments of the present disclosure. In some embodiments, when the virtual scene is a three-dimensional virtual scene, the virtual objects are three-dimensional models created based on skeletal animation technology. Each virtual object has its own shape and volume in the three-dimensional virtual scene, and occupies a portion of a space in the three-dimensional virtual scene.

Typically, in a big world game, the virtual scene has a large spatial range, and may accommodate a large quantity of virtual objects, such as dozens, hundreds, or even thousands of virtual objects.

In addition, for the object management method according to the embodiments of the present disclosure, an execution subject of each step may be the server 20 in the solution implementation environment shown in FIG. 1, or the terminal device 10 (e.g., the client of the target application). In the following method embodiment, for the convenience of description, the execution subject of each step is the server 20 is taken as an example only, but this is not limited in this embodiment.

Figure 2:
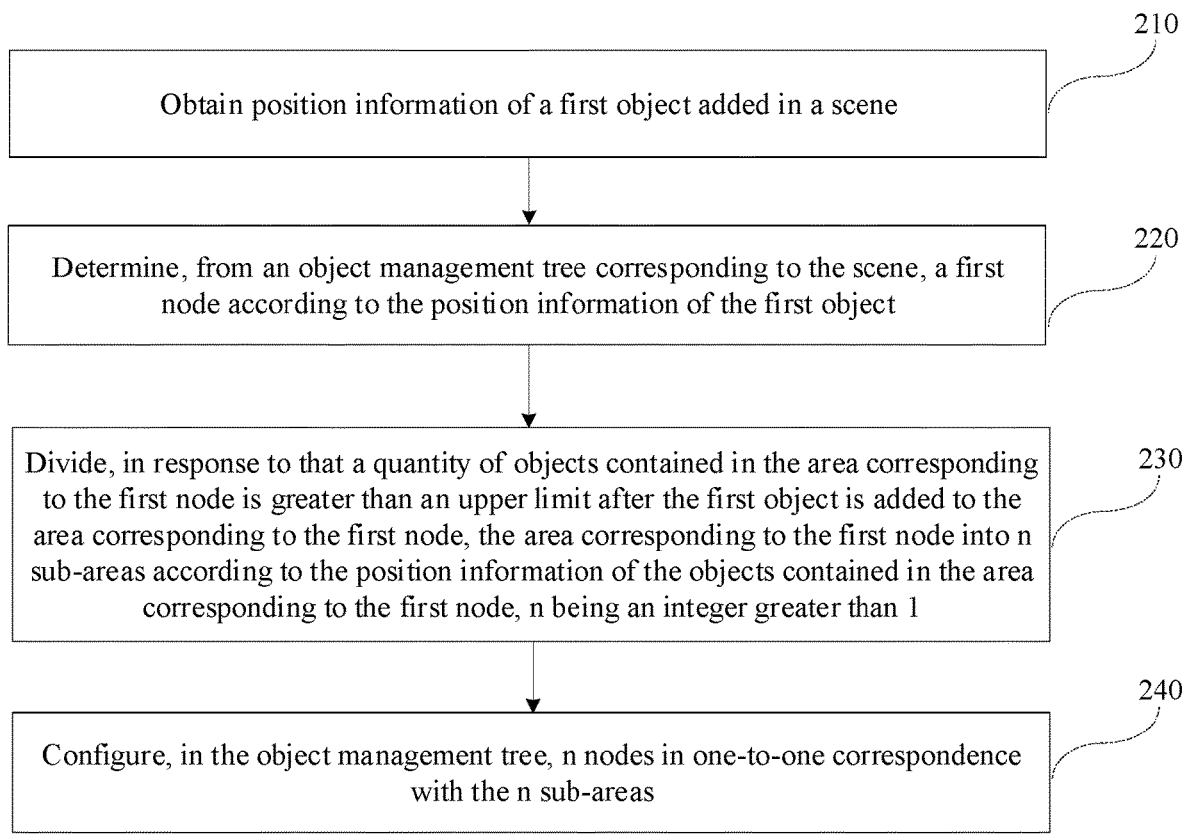
FIG. 2 is a flowchart of an object management method according to an embodiment of the present disclosure.

With reference to FIG. 2, FIG. 2 illustrates a flowchart of an object management method according to an embodiment of the present disclosure. The method may include the following steps (210 to 240):

Step 210: Obtain position information of a first object added in a scene.

The scene may be a 2D (Dimensions) scene, a 3D scene, or a higher dimensional scene. This is not specifically limited in the embodiments of the present disclosure. In some embodiments, the scene may also be a one-dimensional scene. Objects in the scene may be increased or decreased as needed. Taking a game application as an example, the objects in the scene may include virtual objects controlled by players, non-player character (NPC) objects visible to one or some players, public NPC objects visible to all players, etc. As the players log in and the NPC objects are refreshed, the quantity of objects in the scene of the game application increases accordingly.

The first object may be any object added in the scene, and the position information of the first object is used for indicating the position of the first object in the scene, for example, the position information may be represented by coordinates. If the scene is a 2D scene, the scene is a two-dimensional plane, including 2 spatial dimensions (e.g., length and width), and the position information may be represented by two-dimensional coordinates (e.g., a plane rectangular coordinate system); and if the scene is the 2D scene, the objects in the scene may be two-dimensional objects, or may also be regarded as points. If the scene is a 3D scene, the scene is a three-dimensional plane, including 3 spatial dimensions (e.g., length, width, and height), and the position information may be represented by three-dimensional coordinates (e.g., a space rectangular coordinate system); and if the scene is the 3D scene, the objects in the scene may be three-dimensional objects or two-dimensional objects, or may also be regarded as points.

In some embodiments, the scene is a one-dimensional scene, that is, only one dimension (e.g., length) needs to be considered in the scene, the position information may be represented by one-dimensional coordinates, the objects in the scene may be regarded as points in the one dimension, and area division involved in the embodiments of the present disclosure may refer to division of a line segment in the one dimension.

Step 220: Determine, from an object management tree corresponding to the scene, a first node based on the position information of the first object.

In the embodiments of the present disclosure, the object management tree includes a plurality of nodes, each node corresponds to an area in the scene, and areas corresponding to different nodes skip overlapping each other.

The first node refers to a node corresponding to an area to which the position information of the first object belongs. For example, the area to which the position information of the first object belongs is found from the areas respectively corresponding to the nodes contained in the object management tree, and the node corresponding to the found area is the first node.

Step 230: Divide, in response to that a quantity of objects contained in the area corresponding to the first node is greater than an upper limit after the first object is added to the area corresponding to the first node, the area corresponding to the first node into n sub-areas according to position information of the objects contained in the area corresponding to the first node, n being an integer greater than 1; the quantity of objects contained in the sub-areas being the same or close.

An upper limit is a maximum value of the quantity of objects contained in an area. When the quantity of objects contained in the area is greater than the upper limit, the area is divided to obtain a plurality of sub-areas, and the quantity of objects in each sub-area is not greater than or is less than the upper limit. In some embodiments, when the quantity of objects contained in the area is equal to the upper limit, the area is also divided to obtain the plurality of sub-areas.

In some embodiments, the upper limits of the quantity of objects contained in areas corresponding to all nodes in the object management tree are the same. For example, the upper limit of the quantity of objects contained in the areas corresponding to all the nodes in the object management tree is all 5.

In some embodiments, the upper limits of the quantity of objects contained in the areas corresponding to at least two nodes in the object management tree are different. For example, the upper limit of the quantity of objects contained in the area corresponding to one node is 5, and the upper limit of the quantity of objects contained in the area corresponding to the other node is 8.

In some embodiments, the quantity of objects contained in the sub-areas is the same or close, which may mean that a difference in the quantity of objects contained in different sub-areas is less than or equal to a preset difference threshold. Alternatively, the quantity of objects contained in the sub-areas is the same or close, which may mean that a difference in the quantity of objects contained in different sub-areas of the same level is less than or equal to the preset difference threshold. The difference threshold is an integer greater than or equal to 0, such as 0, 1, 2, and 3. The specific value of the difference threshold may be set by a person skilled in the art depending on an actual situation. This is not specifically limited in the embodiments of the present disclosure.

In some embodiments, the quantity of objects contained in the sub-areas is the same or close, which may mean that a variance in the quantity of objects contained in different sub-areas is less than or equal to a variance threshold. Alternatively, the quantity of objects contained in the sub-areas is the same or close, which may mean that a variance in the quantity of objects contained in different sub-areas of the same level is less than or equal to the variance threshold. The variance threshold is a number greater than or equal to 0, such as 0, 0.5, 2.2, and 3.8. The specific value of the variance threshold may be set by a person skilled in the art depending on an actual situation. This is not specifically limited in the embodiments of the present disclosure.

Certainly, the foregoing definition of the same or close quantity of objects contained in the sub-areas is only exemplary, and the same or close quantity of objects contained in the sub-areas may further have other definition modes, which may be specifically set by a person skilled in the art depending on an actual situation. This is not specifically limited in the embodiments of the present disclosure.

In some embodiments, in order to prevent the object management tree from being too complex due to the excessively high tree height of the object management tree, small upper limits of the quantity of objects may be used in the first layers, and large upper limits of the quantity of objects may be used in the later layers, so as to the tree height. Further, the small upper limits of the quantity of objects may be used in the first layers, and no upper limit of the quantity of objects is set in the bottommost layer, so as to control the tree height to be within a set range.

In some embodiments, a lower limit of the quantity of objects contained in the area may further be set, the lower limit is a minimum value of the quantity of objects contained in the area, and unnecessary segmentation of the area may be avoided by setting the lower limit, so that the total quantity of areas in the scene is controlled so as not to be too large. In addition, the lower limits of the quantity of objects contained in the areas corresponding to all the nodes in the object management tree are the same, or the lower limits of the quantity of objects contained in the areas corresponding to at least two nodes in the object management tree are different, which may be set as needed. This is not limited in the present disclosure.

In response to that the quantity of objects contained in the area corresponding to the first node is greater than the upper limit, the area corresponding to the first node is divided into n sub-areas. n may be a preset fixed value, such as n=2, or n=3. This is not limited in the present disclosure. n may also be a dynamically determined value, for example, the value of n is determined according to the quantity of objects contained in an area needing to be divided, for example, n is positively correlated with the quantity of objects contained in the area needing to be divided, and the larger the quantity of objects contained in the area needing to be divided is, the larger n is accordingly. In this case, the value of n may be determined according to the quantity of objects contained in the area needing to be divided by presetting correspondence or a conversion formula between the quantity of objects contained in the area needing to be divided and n.

In some embodiments, step 230 may include the following sub-steps:

1. Determine distance spans of the objects contained in the area corresponding to the first node in k spatial dimensions according to the position information of the objects contained in the area corresponding to the first node, k being a positive integer, such as 1, 2, and 3.

When k is equal to 2, the scene is a two-dimensional plane, with an X axis and a Y axis representing 2 spatial dimensions of the two-dimensional plane.

When k is equal to 3, the scene is a three-dimensional plane, with an X axis, a Y axis, and a Z axis representing 3 spatial dimensions of the three-dimensional plane.

For any of the k spatial dimensions, coordinates of the objects contained in the area corresponding to the first node in the spatial dimension are obtained, a maximum value and a minimum value of the coordinates in the spatial dimension are selected, and the difference between the maximum value and the minimum value is a distance span in the spatial dimension. For each spatial dimension, the same method is used to calculate the distance spans respectively corresponding to the objects contained in the area corresponding to the first node in the k spatial dimensions.

2. Select, from among the k spatial dimensions, a target spatial dimension having the largest distance span;

after the distance spans respectively corresponding to the objects contained in the area corresponding to the first node in the k spatial dimensions are obtained, the spatial dimension having the largest distance span may be found as the target spatial dimension.

3. Divide the area corresponding to the first node into n sub-areas by taking the target spatial dimension as a division reference.

Taking the scene being a two-dimensional plane as an example, assuming that the target spatial dimension is determined to be the X axis from the 2 spatial dimensions of the X axis and the Y axis, the area corresponding to the first node is divided on the X axis to obtain n sub-areas.

Taking the scene being a three-dimensional plane as an example, assuming that the target spatial dimension is determined to be the Y axis from the 3 spatial dimensions of the X axis, the Y axis, and the Z axis, the area corresponding to the first node is divided on the Y axis to obtain n sub-areas.

In some embodiments, step 3 may further include the following sub-steps:

3-1. Determine a first object and a second object that are farthest apart in the target spatial dimension from among the objects contained in the area corresponding to the first node.

Two objects farthest apart in the target spatial dimension, namely the first object and the second object, are determined according to the target spatial dimension having the largest distance span.

3-2. Divide a line segment between two projection points of the first object and the second object in the target spatial dimension into n equal parts to obtain n-1 split points.

The line segment between the two projection points of the first object and the second object in the target spatial dimension are divided into the n equal parts according to the obtained coordinates of the first object and the second object in the target spatial dimension to obtain the n-1 split points.

3-3: Divide the area corresponding to the first node into the n sub-areas based on the n-1 split points.

If the scene is a two-dimensional plane, after the n-1 split points in the target spatial dimension are obtained, n-1 vertical lines that pass through the n-1 split points and are perpendicular to the target spatial dimension are generated, and the area corresponding to the first node is divided into n sub-areas through the n-1 vertical lines.

If the scene is a three-dimensional plane, after the n-1 split points in the target spatial dimension are obtained, n-1 vertical planes that pass through the n-1 split points and are perpendicular to the target spatial dimension are generated, and the area corresponding to the first node is divided into n sub-areas through the n-1 vertical planes.

Figure 3:
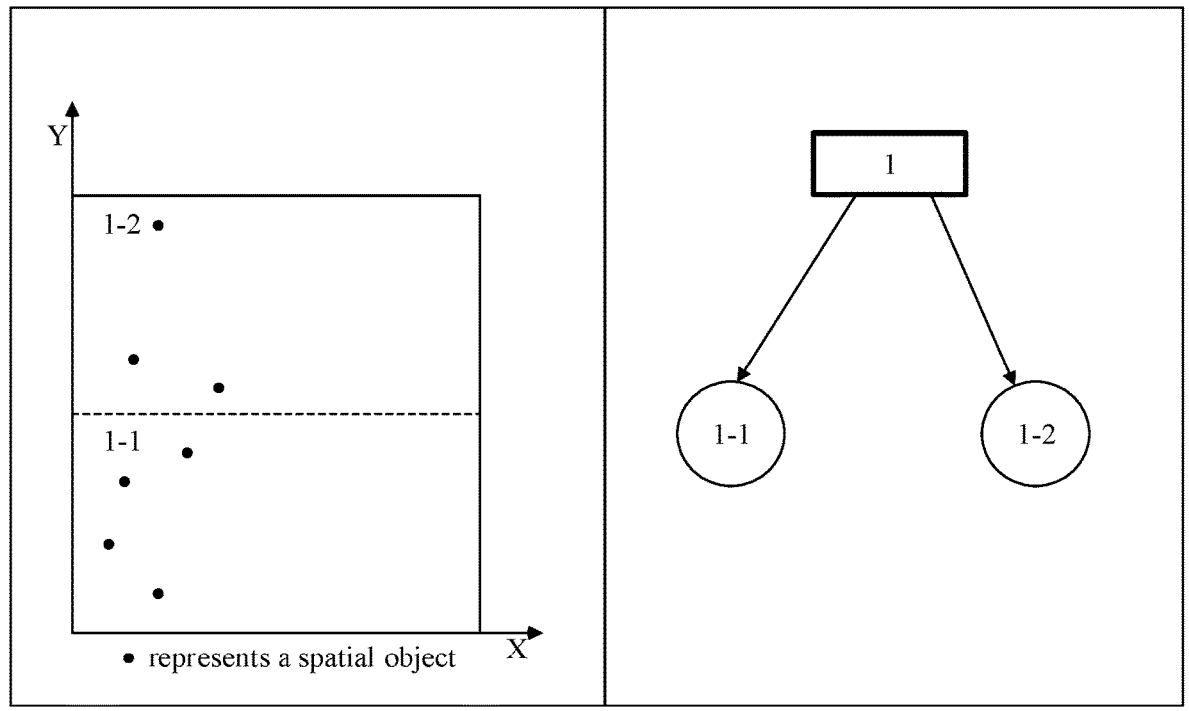
FIG. 3 is a schematic diagram of area division according to an embodiment of the present disclosure.

In some embodiments, as shown in FIG. 3, FIG. 3 is a schematic diagram of first division of an area corresponding to a node 1. The area corresponding to the node 1 is divided into two sub-areas. Because X-axis coordinates of objects in FIG. 3 are similar, and Y-axis coordinates of the objects are more scattered, that is, the distance spans of the objects on the Y axis are greater than the distance spans of the objects on the X axis, the Y axis is selected as the target spatial dimension and a vertical line is made for the Y axis for area division. The area corresponding to the node 1 is divided into two sub-areas according to a median of the Y-axis coordinates of two objects that are farthest apart in FIG. 3 as the vertical line of the Y axis. A sub-area of the upper half contains 3 objects, and a sub-area of the lower half contains 4 objects, satisfying a division requirement of the same or close quantity of objects contained in the sub-areas.

In the foregoing embodiments, provided is a mode of selecting the target spatial dimension having the largest distance span as a division reference to divide the area. This mode enables the sizes of the divided sub-areas to be as equalized as possible, avoiding a situation that one sub-area is too large and another sub-area is too small. Certainly, in some other embodiments, it is also possible to sequentially select the target spatial dimension as the division reference from among the k spatial dimensions, or randomly select the target spatial dimension as the division reference. This is not limited in the present disclosure.

In some embodiments, if the first object is added in the area corresponding to the first node and then the quantity of objects contained in the area corresponding to the first node is greater than the upper limit, whether the size of the area corresponding to the first node is greater than or equal to a set size is determined; if the size of the area corresponding to the first node is greater than or equal to the set size, the area corresponding to the first node is divided into n sub-areas according to the position information of the objects contained in the area corresponding to the first node, n being an integer greater than 1; and if the size of the area corresponding to the first node is less than the set size, the area corresponding to the first node is no longer divided, so as to avoid excessive tree height of the object management tree.

Step 240: Configure, in the object management tree, n nodes in one-to-one correspondence with the n sub-areas.

After the area corresponding to the first node are divided into the n sub-areas, the n nodes in one-to-one correspondence with the n sub-areas need to be configured in the object management tree.

The following describes how to configure the n nodes. In some embodiments, step 240 may include the following sub-steps:

1. Obtain the quantity of child nodes of a parent node of the first node.

The parent node of the first node may include other child nodes in addition to a child node, i.e., the first node. Therefore, the quantity of child nodes of the parent node of the first node may be equal to 1 or greater than 1.

In addition, an upper limit of the quantity of child nodes that each node in the object management tree can have is set. The upper limits of the quantity of child nodes that the nodes can have may be the same or different. This is not limited in the present disclosure. In order to facilitate maintenance and management of the object management tree, the upper limit of the quantity of child nodes that each node in the object management tree can have may be set to the same value, for example, the upper limits are all M, and M is an integer greater than 1. For example, M=8, in which case the object management tree can be referred as an octree. For another example, M=4, in which case the object management tree can be referred as a quadtree. In the embodiments of the present disclosure, the value of M is not limited, and may be flexibly set according to actual needs, such as M=4, 5, 6, 7, or 8.

2. In response to that the quantity of child nodes satisfies a first condition, add n-1 sibling nodes of the first node in the object management tree, and configure the first node and the n-1 sibling nodes to be in one-to-one correspondence with the n sub-areas.

The first condition means that the quantity of child nodes plus n-1 is less than or equal to the upper limit M. If the quantity of child nodes satisfies the first condition, n-1 nodes are added to the object management tree, and the first node and the added n-1 nodes are sibling nodes of each other.

Figure 4:
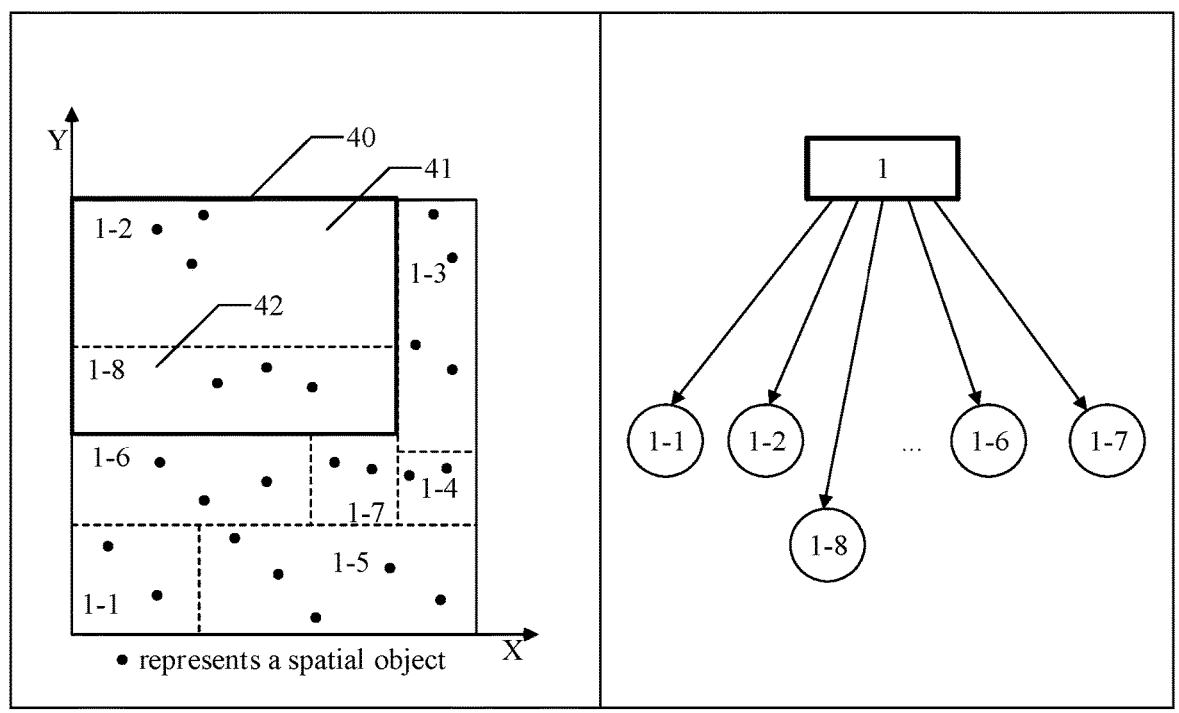
FIG. 4 is a schematic diagram of area division according to another embodiment of the present disclosure.

In some embodiments, as shown in FIG. 4, the left figure illustrates an area corresponding to a node 1, areas respectively corresponding to child nodes of the node 1, and objects contained in the areas. The upper limit of the quantity of objects contained in the areas are 5. A node 1-2 corresponds to an area 1-2 (as shown by a thick line frame 40 in the left figure). The quantity of objects contained in the area 1-2 is 5. After an object is added in the area 1-2, the quantity of objects contained in the area 1-2 is 6, exceeding the upper limit of 5, and then the area 1-2 is divided into two sub-areas, i.e., a sub-area 41 and a sub-area 42 as shown in the figure. The sub-area 41 and the sub-area 42 both contain 3 objects, and the quantity of the objects in the sub-area 41 and in the sub-area 42 is equalized and below the upper limit of 5.

In addition, it is assumed that the upper limit of the quantity of child nodes that a parent node (i.e., the node 1) of the node 1-2 can have is 8. In this case, the quantity of child nodes of the node 1 is 7, and does not exceed the upper limit of 8 after being added with 1. Then a sibling node of the node 1-2 is added to the object management tree, and the sibling node is as shown by a node 1-8 in FIG. 4. After the object management tree is updated, the node 1-2 corresponds to the sub-area 41, and the node 1-8 corresponds to the sub-area 42.

3. In response to that the quantity of child nodes satisfies a second condition, add n child nodes of the first node in the object management tree, and configure the n child nodes to be in one-to-one correspondence with the n sub-areas.

The second condition means that the quantity of child nodes is equal to the upper limit M. If the quantity of child nodes satisfies the second condition, n nodes are added to the object management tree, and the added n nodes are all child nodes of the first node.

Figure 5:
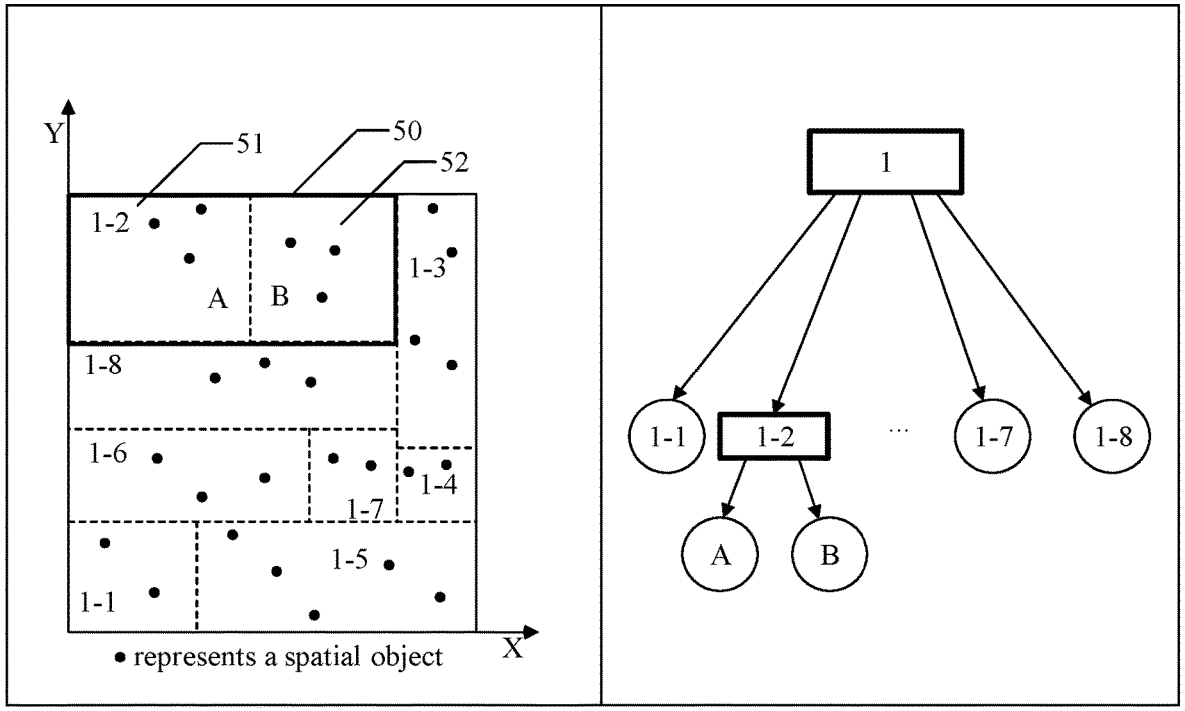
FIG. 5 is a schematic diagram of area division according to another embodiment of the present disclosure.

In some embodiments, as shown in FIG. 5, the left figure illustrates an area corresponding to a node 1, areas respectively corresponding to child nodes of the node 1, and objects contained in the areas. The upper limit of the quantity of objects contained in the areas are 5. A node 1-2 corresponds to an area 1-2 (as shown by a thick line frame 50 in the left figure). The quantity of objects contained in the area 1-2 is 5. After an object is added in the area 1-2, the quantity of objects contained in the area 1-2 is 6, exceeding the upper limit of 5, and then the area 1-2 is divided into two sub-areas, i.e., a sub-area 51 and a sub-area 52 as shown in the figure. The sub-area 51 and the sub-area 52 both contain 3 objects, and the quantity of the objects in the sub-area 41 and in the sub-area 42 is equalized and below the upper limit of 5.

In addition, it is assumed that the upper limit of the quantity of child nodes that a parent node (i.e., the node 1) of the node 1-2 can have is 8. In this case, the quantity of child nodes of the node 1 is 8, which has reached the upper limit of 8. Then two child nodes of the node 1-2 are added to the object management tree, and the two child nodes are as shown by a node A and a node B in FIG. 5. After the object management tree is updated, the node A corresponds to the sub-area 51, and the node B corresponds to the sub-area 52.

If the area corresponding to the first node is divided into 2 sub-areas, that is, n is equal to 2, there are only two situations of the first condition and the second condition.

If the area corresponding to the first node is divided into 3 or more sub-areas, that is, n is greater than or equal to 3, in addition to the two situations of the first condition and the second condition, there may further be a third condition as follows.

In some embodiments, in response to that the quantity of child nodes satisfies the third condition, $n_1$ sibling nodes of the first node are added in the object management tree, $n_2$ child nodes of the first node are added in the object management tree, and the $n_1$ sibling nodes and the $n_2$ child nodes are configured to be in one-to-one correspondence with the n sub-areas, $n_1$ and $n_2$ being positive integers, and $n_1+n_2$ being equal to n.

The third condition means that the quantity of child nodes is less than the upper limit M, but the quantity of child nodes is greater than the upper limit M after being added with n-1. If the quantity of child nodes satisfies the third condition, n nodes are added to the object management tree, $n_1$ nodes being the sibling nodes of the first node, $n_2$ nodes being the child nodes of the first node, and $n_1+n_2$ being equal to n.

Figure 6:
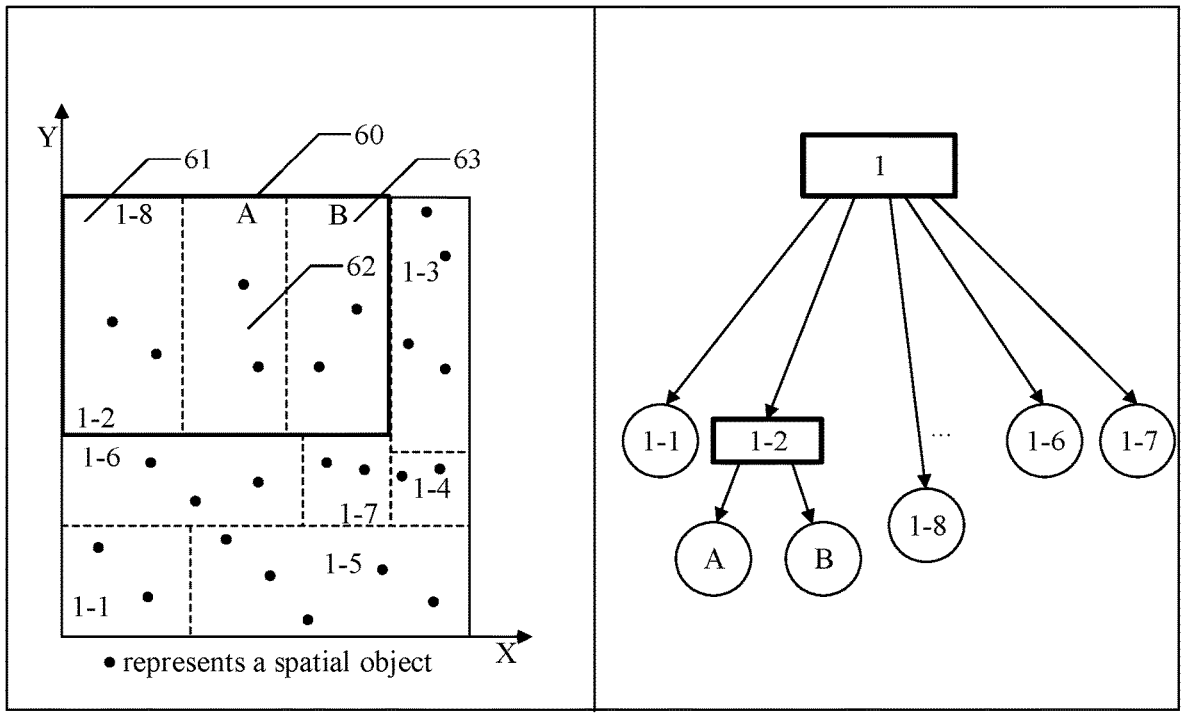
FIG. 6 is a schematic diagram of area division according to another embodiment of the present disclosure.

In some embodiments, as shown in FIG. 6, the left figure illustrates an area corresponding to a node 1, areas respectively corresponding to child nodes of the node 1, and objects contained in the areas. The upper limit of the quantity of objects contained in the areas are 5. A node 1-2 corresponds to an area 1-2 (as shown by a thick line frame 60 in the left figure). The quantity of objects contained in the area 1-2 is 5. After an object is added in the area 1-2, the quantity of objects contained in the area 1-2 is 6, exceeding the upper limit of 5, and then the area 1-2 is divided into three sub-areas, i.e., a sub-area 61, a sub-area 62, and a sub-area 63 as shown in the figure. The sub-area 61, the sub-area 62, and the sub-area 63 all contain 2 objects, and the quantity of the objects in the sub-area 61, in the sub-area 62, and in the sub-area 63 is equalized and below the upper limit of 5.

In addition, it is assumed that the upper limit of the quantity of child nodes that a parent node (i.e., the node 1) of the node 1-2 can have is 8. In this case, the quantity of child nodes of the node 1 is 7, which does not reach the upper limit of 8, but if 2 nodes are added, the quantity thereof is to be greater than the upper limit of 8, then a sibling node of the node 1-2 is added to the object management tree, i.e., a node 1-8 as shown in FIG. 6, and two child nodes of the node 1-2 are added to the object management tree, i.e., a node A and a node B as shown in FIG. 6. After the object management tree is updated, the node 1-8 corresponds to the sub-area 61, the node A corresponds to the sub-area 62, and the node B corresponds to the sub-area 63.

In a technical solution provided in an embodiment of the present disclosure, when excessive objects are present in a certain area of the scene and need to be split, the area is divided into a plurality of sub-areas according to the distribution position of objects contained in the area, and the quantity of objects contained in the sub-areas is as equal as possible. That is, the space sizes of the sub-areas are not the same, but the quantity of the objects managed in the sub-areas is relatively uniform, so that the quantity of nodes can be prevented from increasing too quickly, internal memory occupation is reduced, and the quantity of objects managed in a certain area may be directly divided into n equal parts to improve the efficiency of object management.

In addition, the area is divided by selecting the target spatial dimension having the largest distance span as the division reference, and this mode enables the sizes of the divided sub-areas to be as equalized as possible, avoiding a situation that one sub-area is too large and another sub-area is too small.

In addition, when nodes are added to the object management tree, it is determined by means of conditions that the sibling node is added first and then the child nodes are added. Such a mode of dividing an area as needed and adding nodes as needed can prevent the tree height from increasing too quickly and reduce the complexity of the object management tree.

Figure 7:
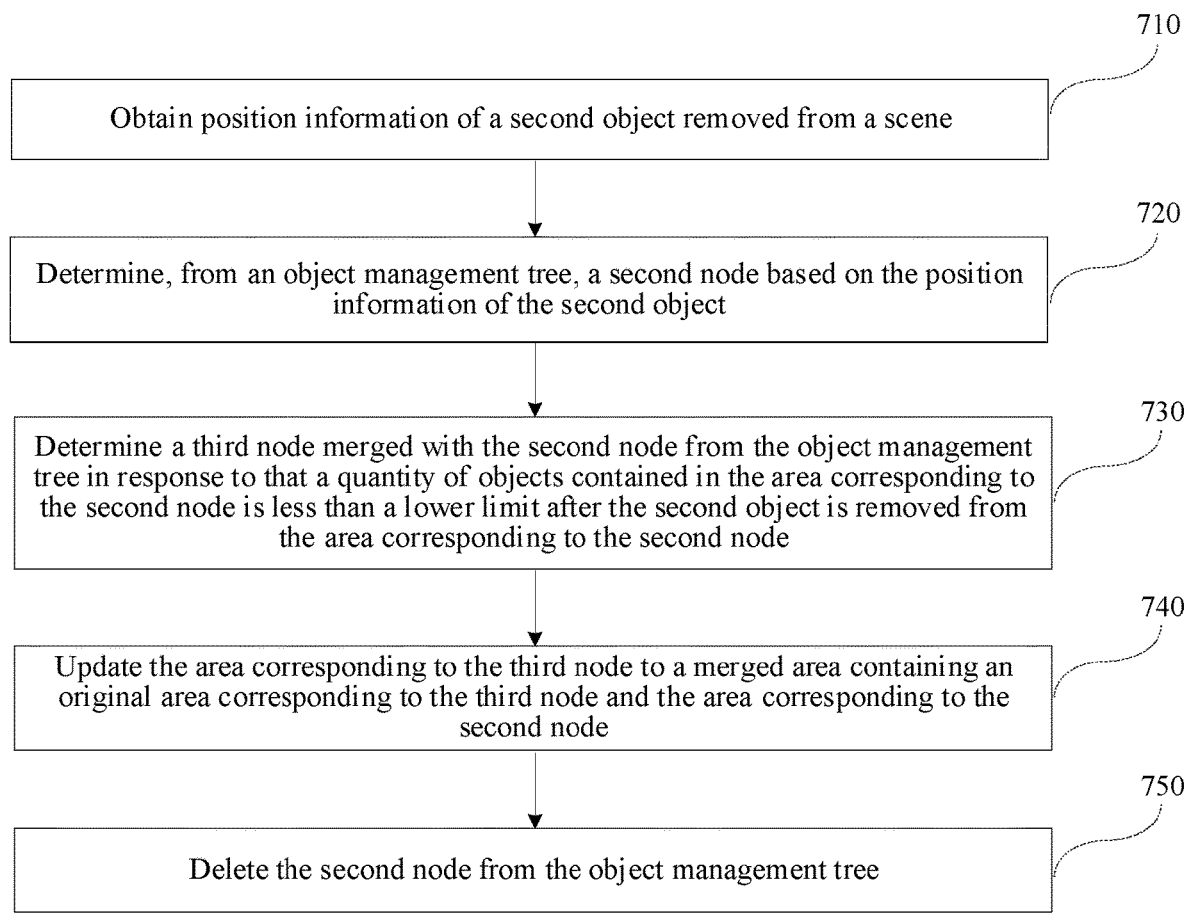
FIG. 7 is a flowchart of an object management method according to another embodiment of the present disclosure.

With reference to FIG. 7, FIG. 7 illustrates a flowchart of an object management method according to another embodiment of the present disclosure. The method may include the following steps (710 to 750):

Step 710: Obtain position information of a second object reduced from a scene.

The second object may be any object reduced/removed from the scene, and the position information of the second object is used for indicating the position of the second object in the scene, for example, the position information may be represented by coordinates. If the scene is a 2D scene, the position information may be represented by two-dimensional coordinates; and if the scene is a 3D scene, the position information may be represented by three-dimensional coordinates.

Step 720: Determine, from an object management tree, a second node according to the position information of the second object.

Reference may be made to the foregoing embodiments for the introduction related to the object management tree corresponding to the scene. Details are not described herein again.

The second node refers to a node corresponding to an area to which the position information of the second object belongs. For example, the area to which the position information of the second object belongs is found from the areas respectively corresponding to the nodes contained in the object management tree, and the node corresponding to the found area is the second node.

Step 730: Determine a third node merged with the second node from the object management tree in response to that a quantity of objects contained in the area corresponding to the second node is less than a lower limit after the second object is removed from the area corresponding to the second node.

The lower limit is a minimum value of the quantity of objects contained in the area. When the quantity of objects contained in the area is less than the lower limit, the area is merged with other areas, so that the quantity of objects contained in a merged area is not less than or is greater than the lower limit. In some embodiments, when the quantity of objects contained in an area is equal to the lower limit, the area is also merged with other areas.

In some embodiments, the lower limits of the quantity of objects contained in the areas corresponding to all the nodes in the object management tree are the same. For example, the lower limits of the quantity of objects contained in the areas corresponding to all the nodes in the object management tree are all 2.

In some embodiments, the lower limits of the quantity of objects contained in the areas corresponding to at least two nodes in the object management tree are different. For example, the lower limit of the quantity of objects contained in the area corresponding to one node is 2, and the lower limit of the quantity of objects contained in the area corresponding to the other node is 3.

In response to that the second object is reduced from the area corresponding to the second node and then the quantity of objects contained in the area corresponding to the second node is less than the lower limit, whether there is a third node, that satisfies a merging condition with the second node, in the object management tree is searched. The quantity of the third node may be one or multiple.

The merging condition includes: the area corresponding to the second node and the area corresponding to the third node are adjacent. For a 2D scene, the area corresponding to the second node and the area corresponding to the third node are adjacent, which means that the area corresponding to the second node and the area corresponding to the third node have overlapping edges. For a 3D scene, the area corresponding to the second node and the area corresponding to the third node are adjacent, which means that the area corresponding to the second node and the area corresponding to the third node have overlapping planes.

In some embodiments, the merging condition further includes: a merged area of the area corresponding to the second node and the area corresponding to the third node is a regular area. For the 2D scene, the merged area of the area corresponding to the second node and the area corresponding to the third node is a regular area, which means that the merged area of the area corresponding to the second node and the area corresponding to the third node is a rectangle, that is, a rectangle or a square. For the 3D scene, the area corresponding to the second node and the area corresponding to the third node are adjacent, which means that the merged area of the area corresponding to the second node and the area corresponding to the third node is a cuboid or cube.

Step 740: Update the area corresponding to the third node to a merged area formed by an original area corresponding to the third node and the area corresponding to the second node.

The area corresponding to the second node is merged to the area corresponding to the third node after the third node that satisfies the merging condition is found. After merging, the area corresponding to the third node is to be larger than the original area thereof.

Step 740 may include the following two situations.

Situation 1: Update the area corresponding to the third node to a merged area of the original area corresponding to the third node and a complete area corresponding to the second node when a quantity of third node is one.

Figure 8:
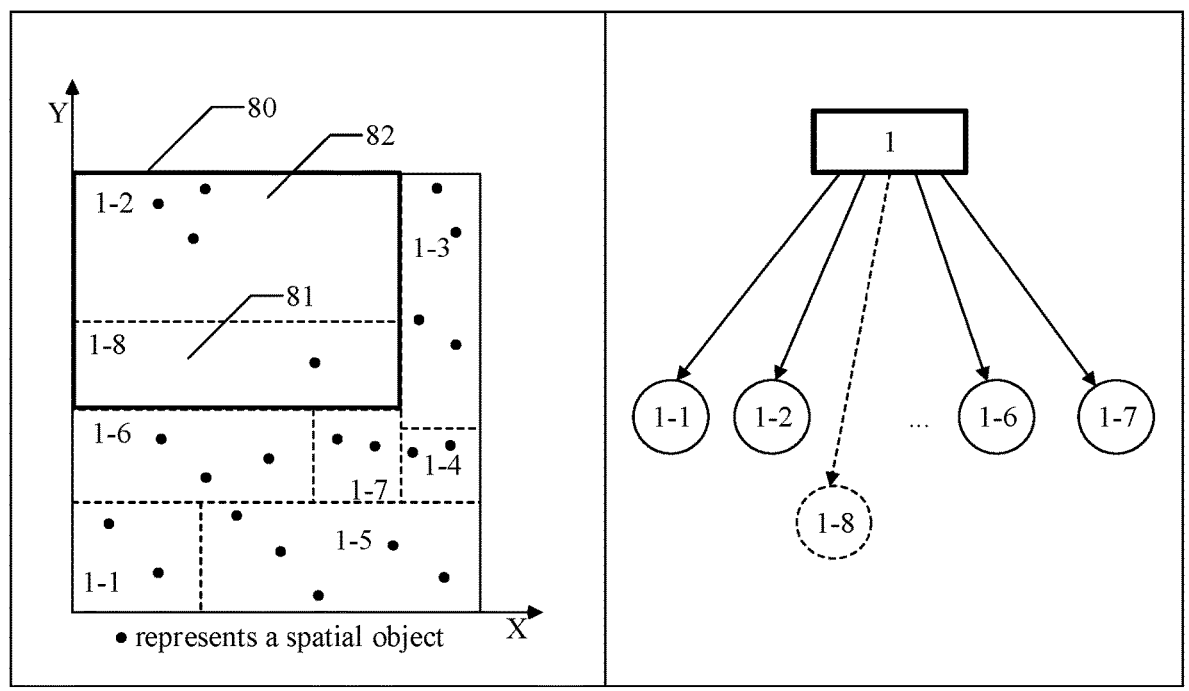
FIG. 8 is a schematic diagram of area merging according to an embodiment of the present disclosure.

As shown in FIG. 8, the left figure illustrates an area corresponding to a node 1, areas respectively corresponding to child nodes of the node 1, and objects contained in the areas. The lower limit of the quantity of objects contained in the areas are 2. A node 1-8 corresponds to an area 1-8 (which is represented by an area 81 in the figure), and if the quantity of objects contained in the area 1-8 is 1, which is less than the lower limit of 2, the area 1-8 is merged. If the area 1-2 (which is represented by an area 82 in the figure) corresponding to the node 1-2 satisfies the merging condition, the area 1-8 and area 1-2 are merged to form a merged area 80 (as shown in the figure with a thick line frame). After merging, the area corresponding to the node 1-2 changes from the original area 82 to the merged area 80.

Situation 2: Divide the area corresponding to the second node into k sub-areas when the quantity of third nodes is k (k is an integer greater than 1), the k third nodes matching the k sub-areas in a one-to-one manner; and update, for each of the k third nodes, the area corresponding to the third node to a merged area of the original area corresponding to the third node and a sub-area matching the third node among the k sub-areas.

Figure 9:
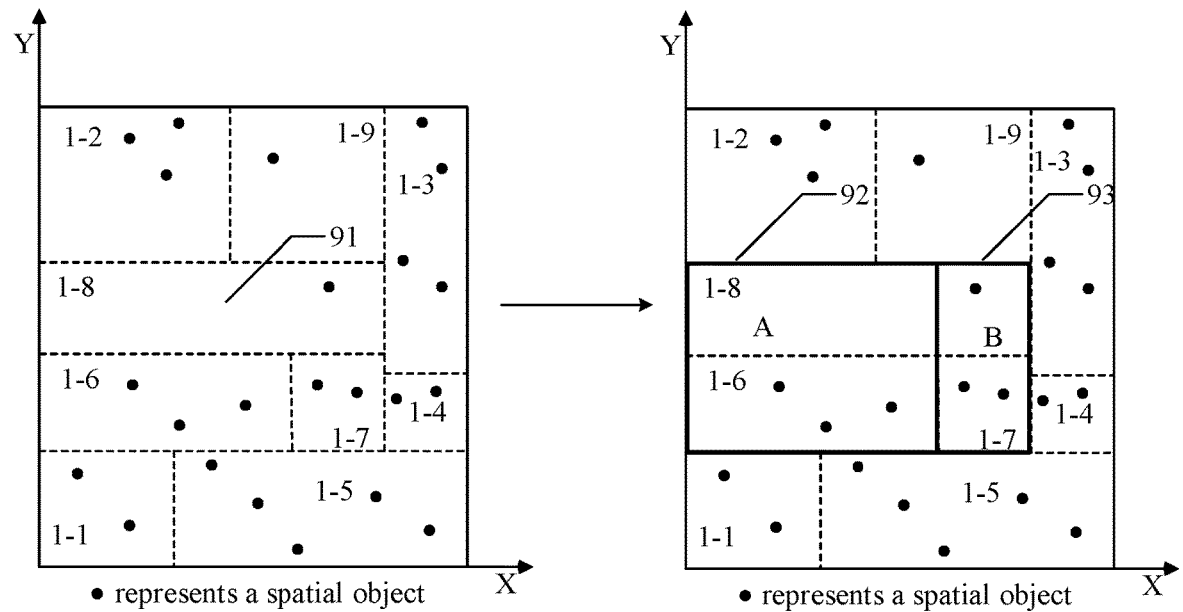
FIG. 9 is a schematic diagram of area merging according to another embodiment of the present disclosure.

As shown in FIG. 9, the left figure illustrates an area corresponding to a node 1, areas respectively corresponding to child nodes of the node 1, and objects contained in the areas. The lower limit of the quantity of objects contained in the areas are 2. A node 1-8 corresponds to an area 1-8 (which is represented by an area 91 in the figure), and if the quantity of objects contained in the area 1-8 is 1, which is less than the lower limit of 2, the area 1-8 is merged. If areas corresponding to a node 1-6 and a node 1-7 satisfy the merging condition, the area 1-8 is divided into 2 sub-areas, i.e., an area A and an area B as shown in the right figure. The area A and an area 1-6 are merged to form a merged area 92 (as shown in the figure with a thick line frame), and the area B and an area 1-7 are merged to form another merged area 93 (as shown in the figure with a thick line frame). In some embodiments, in some other examples, the area 1-8 may also be merged with the area 1-2 and an area 1-9.

Step 750: Delete the second node from the object management tree.

After the area corresponding to the second node and the area corresponding to the third node are merged, the area corresponding to the second node is assigned to the third node, and the second node no longer has a corresponding area and is deleted from the object management tree. As shown in FIG. 8, after the area corresponding to the node 1-8 and the area corresponding to the node 1-2 are merged, the node 1-8 is deleted from the object management tree.

Figure 10:
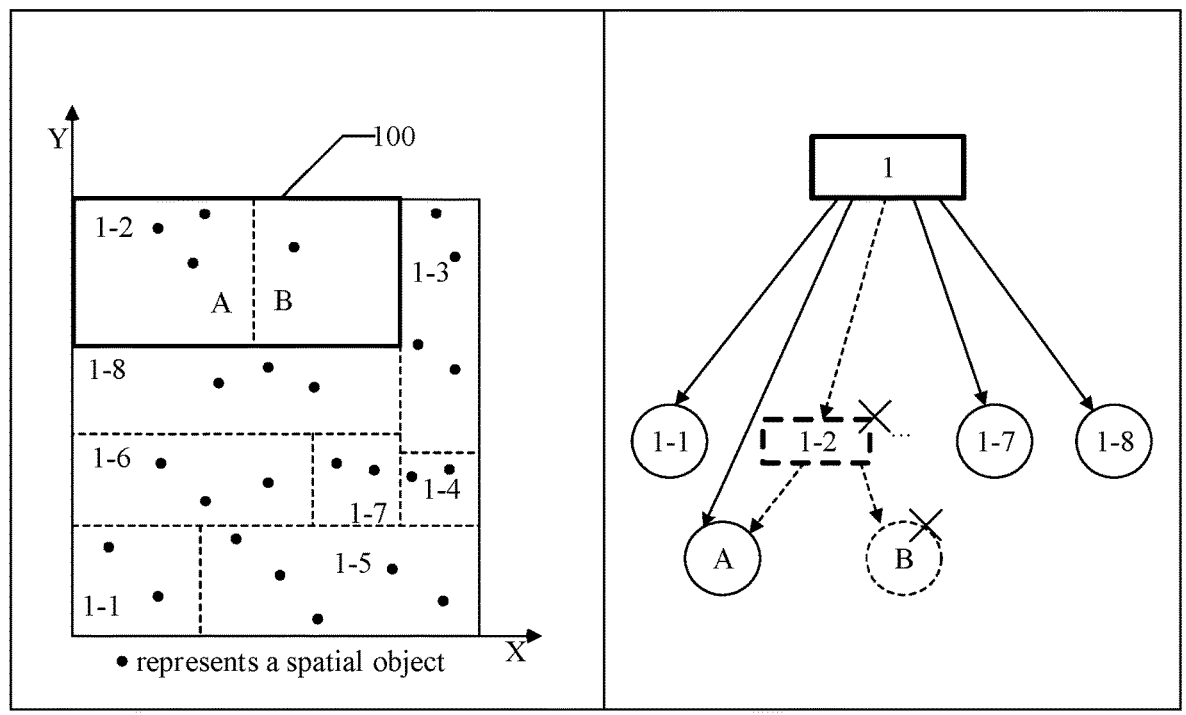
FIG. 10 is a schematic diagram of area merging according to another embodiment of the present disclosure.

In some embodiments, if a parent node of the third node has one and only one child node, the parent node of the third node is deleted from the object management tree, and the third node is taken as a child node of a grandparent node thereof. As shown in FIG. 10, the node 1-2 originally contained two child nodes, namely the node A and the node B. Because the quantity of objects contained in the area corresponding to the node B is 1, which is less than the lower limit of 2, the area corresponding to the node B and the area corresponding to the node A are merged to obtain a merged area 100 (as shown in the figure with a thick line frame). After merging, the area corresponding to the node A changes from the original area A to the merged area 100, and the node B is deleted from the object management tree. After the node B is deleted, a parent node (i.e., the node 1-2) of the node A has one and only one child node (i.e., the node A), then the node 1-2 is deleted from the object management tree, and the node A is taken as a child node of a grandparent node (i.e., the node 1) thereof. By means of the foregoing mode, redundant nodes can be reduced, the tree height can be reduced, the structure of the object management tree can be simplified, and the waste of space management resources can be avoided.

In a technical solution provided in an embodiment of the present disclosure, when the quantity of objects in a certain area of the scene is small, the area is merged with other areas, so as to simplify the structure of the object management tree and avoid the waste of space management resources.

Figure 11:
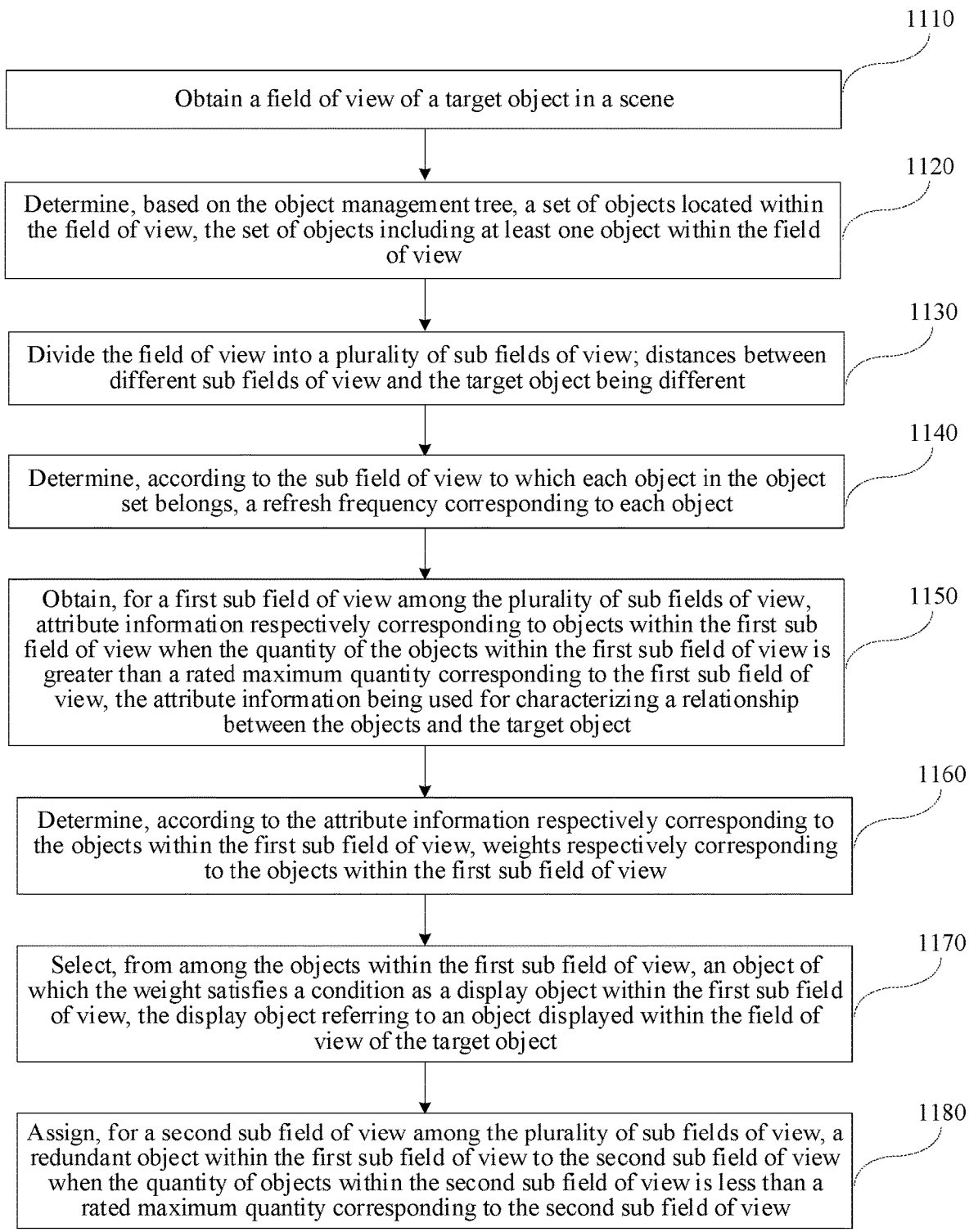
FIG. 11 is a flowchart of an object management method according to another embodiment of the present disclosure.

With reference to FIG. 11, FIG. 11 illustrates a flowchart of an object management method according to another embodiment of the present disclosure. The method may include the following steps (1110 to 1180):

Step 1110: Obtain a field of view of a target object in a scene.

The field of view of the target object refers to an area that the target object can observe in the scene, and a picture in the area needs to be displayed in a client that controls the target object. In the embodiments of the present disclosure, the shape of the field of view of the target object is not limited. Exemplarily, for a 2D scene, the field of view of the target object may be a sectorial area, the center of a circle of the sectorial area may be located at the position of the target object, and the sectorial area is located directly in front of the target object. For a 3D scene, the field of view of the target object may be a conical area, a vertex of the conical area may be located at the position of the target object, and the conical area is located directly in front of the target object.

Certainly, in some other embodiments, the field of view of the target object may also be in other shapes such as circle (or sphere) and rectangle (or cube), which can be flexibly customized in combination with actual needs. This is not limited in the present disclosure.

Step 1120: Determine, based on the object management tree, a set of objects located within the field of view, the set of objects including at least one object within the field of view.

Because attribute information of the objects in the scene is recorded in the object management tree corresponding to the scene, such as position and state, the set of objects located within the field of view may be found based on the object management tree.

For example, firstly, at least one target node of which a corresponding area intersects the field of view of the target object is selected according to the areas corresponding to the nodes in the object management tree, then position information of objects contained in the area corresponding to the target node is obtained, whether the position information of each object belongs to the field of view of the target object is determined, and objects that belong to the field of view of the target object are selected to obtain the set of objects within the field of view.

In some embodiments, after determining the set of objects located within the field of view of the target object, the server obtains attribute information of the objects contained in the set of objects, and transmits the attribute information of the objects contained in the set of objects to a client corresponding to the target object, so that the client can display the set of objects based on the attribute information.

Figure 12:
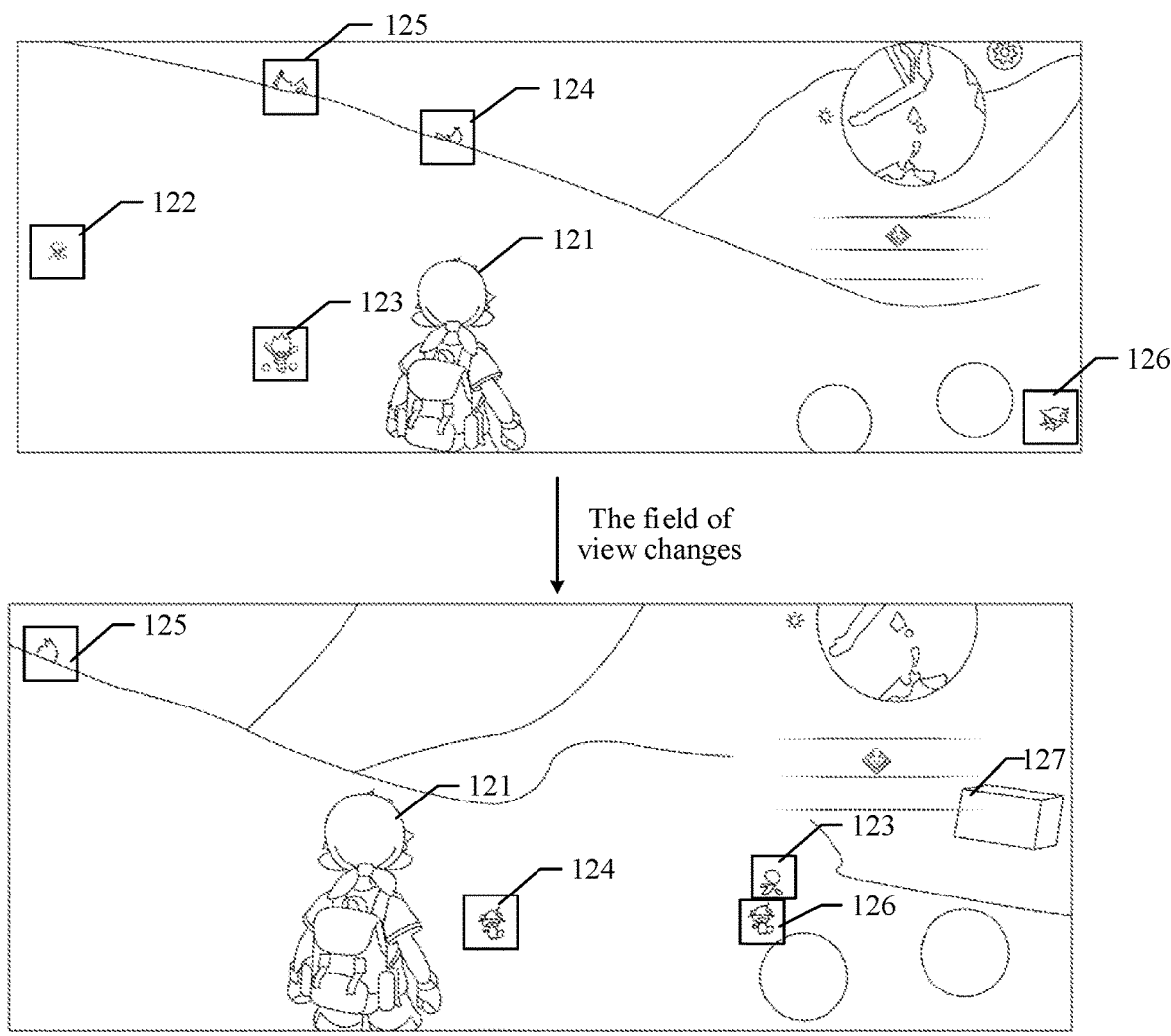
FIG. 12 is a schematic diagram of a change of a field of view according to an embodiment of the present disclosure.

In the embodiments of the present disclosure, the field of view may also be referred to as an AOI field of view. As the target object moves, turns, etc. in the scene, the field of view of the target object changes, and accordingly, the set of objects within the field of view of the target object also changes. Exemplarily, as shown in FIG. 12, in an upper figure, 5 pets can be seen within a field of view of a target object 121, and respectively recorded as a pet 122, a pet 123, a pet 124, a pet 125, and a pet 126. With the movement of the target object 121 or the movement of the pets, some things may leave the field of view of the target object 121, and some things may enter the field of view of the target object 121. For example, in a lower figure of FIG. 12, the pet 122 leaves the field of view of the target object 121, and a treasure chest 127 enters the field of view of the target object 121. The server periodically updates the field of view of the target object, and then synchronizes the latest data related to the set of objects within the field of view to the client for display.

In some embodiments, after determining the set of objects located within the field of view of the target object, the server may further execute the following steps 1130 to 1140.

Step 1130: Divide the field of view into a plurality of sub fields of view; distances between different sub fields of view and the target object are different.

The field of view of the target object is divided into a plurality of sub fields of view according to the distances from the target object. The sizes of the plurality of sub fields of view may be the same or different, and the total size of the plurality of sub fields of view is the size of the field of view of the target object.

Figure 13:
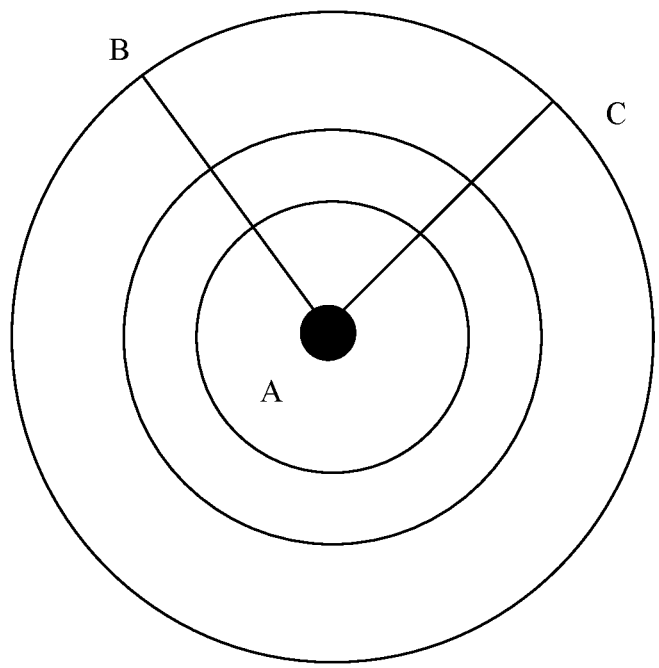
FIG. 13 is a schematic diagram of division of a field of view according to an embodiment of the present disclosure.

In some embodiments, as shown in FIG. 13, in a third-person game, the field of view of the target object is a circle having a radius of AB. As shown in the figure, the field of view of the target object is divided into 3 sub fields of view, and the field of view is divided into an inner layer, a middle layer, and an outer layer according to the distances between the sub fields of view and the target object.

In some embodiments, as shown in FIG. 13, in a first-person game, the field of view of the target object is a sector BAC having a radius of AB. As shown in the figure, the field of view of the target object is divided into 3 sub fields of view, and the field of view is divided into an inner layer, a middle layer, and an outer layer according to the distances between the sub fields of view and the target object.

The sub field of view corresponding to the inner layer is closest to the target object, the sub field of view corresponding to the outer layer is farthest from the target object, and the distance between the sub field of view corresponding to the middle layer and the target object is between the inner layer and the outer layer.

Step 1140: Determine, according to the sub field of view to which each object in the set of objects belongs, a refresh frequency corresponding to each object; the refresh frequency corresponding to the object being negatively correlated with the distance between the sub field of view to which the object belongs and the target object.

The refresh frequency of objects within each sub field of view is set, the refresh frequency of an object refers to an update frequency of real-time information (such as position and action) of the object, such as the quantity of refresh per second. For users who control the target object, the focus thereof is generally on some other objects closer to the target object, while some other objects farther away from the target object are not the focus. Therefore, by setting a refresh frequency according to the distance between each sub field of view and the target object, the closer the distance between the sub field of view and the target object is, the higher the refresh frequency is, so as to ensure that the objects that the users focus on can be displayed in high quality; the farther the distance between the sub field of view and the target object is, the lower the refresh frequency is, so that the objects that the users do not focus on can be displayed in low quality, helping save processing resources on both the server and the client.

In addition, in some other embodiments, the refresh frequency of the objects contained in each sub field of view may also be determined according to the priority of the sub field of view. For example, the higher the priority is, the higher the refresh frequency is; conversely, the lower the priority is, the lower the refresh frequency is. The priority of the sub field of view may be related to the distance between the sub field of view and the target object, or to attention of the sub field of view. In some embodiments, the priority of the sub field of view may be dynamically adjusted. For example, taking a shooting game as an example, in a general case, the priority of a sub field of view is determined by a distance, and the closer the sub field of view is to the target object, the higher the priority thereof is, and the higher the refresh frequency thereof is. When the target object uses a sniper gun to open a mirror and aim, the priority of a sub field of view is determined by attention, a sub field of view to which an aimed position belongs has a high degree of attention, the priority of the sub field of view is increased accordingly, and the refresh frequency is also increased accordingly.

In some embodiments, the method provided in an embodiment of the present disclosure may further include the following steps 1150 to 1170.

Step 1150: Obtain, for a first sub field of view among the plurality of sub fields of view, attribute information respectively corresponding to objects within the first sub field of view in response to that the quantity of the objects within the first sub field of view is greater than a rated maximum quantity corresponding to the first sub field of view, the attribute information being used for characterizing a relationship between the objects and the target object.

The first sub field of view may be any of the plurality of sub fields of view. The rated maximum quantity corresponding to the first sub field of view refers to a rated maximum value of the quantity of objects contained within the first sub field of view. For different sub fields of view, the corresponding rated maximum quantity thereof may be the same or different. This is not limited in the present disclosure.

Exemplarily, assuming that the rated maximum quantity corresponding to the first sub field of view is 25, and an actual value of the quantity of objects within the first sub field of view is 30, which exceeds the rated maximum quantity of 25, some objects need to be selected from among the objects within the first sub field of view for removal. In the embodiment of the present disclosure, objects to be displayed and removed are determined according to the attribute information of the objects. The attribute information of an object includes but is not limited to at least one of the following: whether the object is a friend, teammate, or enemy for the target object, the distance between the object and the target object, the intimacy between the object and the target object, whether there is interaction with the target object, etc. This is not limited in the present disclosure.

Step 1160: Determine, according to the attribute information respectively corresponding to the objects within the first sub field of view, weights respectively corresponding to the objects within the first sub field of view.

For each object within the first sub field of view, a weight corresponding to the object is determined according to the attribute information of the object. The weight is used for characterizing the selection priority of the object. For example, the higher the weight of an object is, the more the object is to be retained for display; and the lower the weight of an object is, the more the object is to be removed.

In addition, in the embodiment of the present disclosure, a mode of calculating the weight according to the attribute information is not limited, for example, the weight may be calculated by setting a formula, an algorithm, or a neural network model.

Step 1170: Select, among the objects within the first sub field of view, an object of which the weight satisfies a condition as a display object within the first sub field of view, the display object referring to an object displayed within the field of view of the target object.

For example, assuming that the rated maximum quantity corresponding to the first sub field of view is $N_{max}$, $N_{max}$ objects having maximum weights are selected as display objects within the first sub field of view from among the objects within the first sub field of view.

In some embodiments, among the objects within the first sub field of view, redundant objects other than said objects selected as the display objects may be removed from the first sub field of view, for example, the redundant objects are not displayed within the field of view of the target object.

In some embodiments, the method provided in the embodiment of the present disclosure may further include the following step 1180:

Step 1180: Assign, for a second sub field of view among the plurality of sub fields of view, a redundant object within the first sub field of view to the second sub field of view in response to that the quantity of objects within the second sub field of view is less than a rated maximum quantity corresponding to the second sub field of view.

The redundant object refers to an object, within the first sub field of view, of which the weight does not satisfy the condition, and the redundant object is displayed according to a refresh frequency corresponding to the second sub field of view. In some embodiments, the redundant object may also be displayed according to the refresh frequency corresponding to the first sub field of view.

Exemplarily, assuming that the rated maximum quantity corresponding to the second sub field of view is 20, and the actual value of the quantity of objects within the second sub field of view is 10, there are 10 spare places within the second sub field of view. If there are 5 redundant objects within the first sub field of view, the 5 redundant objects may be assigned to the second sub field of view, and the 5 redundant objects are displayed according to the refresh frequency corresponding to the second sub field of view. Compared with directly removing the redundant objects, the mode above may effectively use spare places within other sub fields of view, avoid waste of resources, and ensure that as many objects as possible within the field of view are displayed.

In addition, assuming that the quantity of spare places within the second sub field of view is a, a being a positive integer, and the quantity of redundant objects within the first sub field of view is b, b being a positive integer, and if a is greater than or equal to b, the b redundant objects may all be directly assigned to the second sub field of view; if a is less than b, a redundant objects may be selected from the b redundant objects to be assigned to the second sub field of view. The selection mode herein may be based on the weights corresponding to the objects, for example, redundant objects having maximum weights are selected, or random selection can be performed. This is not limited in the present disclosure.

In addition, it is possible to assign redundant objects within a sub field of view to a plurality of different sub fields of view; it is also possible to assign redundant objects from a plurality of different sub fields of view to one sub field of view.

In addition, if there are a plurality of sub fields of view having redundant objects, the redundant objects within the sub field of view having high priority may be prioritized according to the priority of the sub fields of view and assigned to other sub fields of view having spare places. The priority of the sub field of view may be related to the distance between the sub field of view and the target object, or to attention of the sub field of view. For details, please refer to the introduction content above, which is not repeated here.

In a technical solution provided in an embodiment of the present disclosure, by dividing the field of view of the object, different refresh frequencies are set for different sub fields of view, so that management of the field of view of the object is more reasonable. By reducing the refresh frequency of objects within a sub field of view in an outer layer or having low priority, the burden on the server and the client can be reduced as much as possible while the display quality of the objects that the users focus on is ensured.

In addition, after the weights of objects in the field of view are calculated, the objects having high weights are displayed first. Important objects in the field of view are displayed while the burden on the server and the client is reduced, so that the display of objects in the field of view is more reasonable.

In addition, in the embodiment of the present disclosure, field of view update and object management are completely decoupled, so that field of view customization is very convenient and simple. For example, the shape of the field of view of the target object can be flexibly customized and adjusted, and the size of the field of view of the target object can also be flexibly customized and adjusted. Taking a game as an example, if the target object uses a certain item or function, and the field of view increases, only the field of view needs to be updated, and then a set of objects within the field of view is searched and obtained from the object management tree according to the updated field of view, that is, the update of the field of view does not affect object management of the object management tree, and the set of objects within the field of view can still be efficiently and accurately determined after the field of view is updated.

The following describes apparatus embodiments of the present disclosure, which can be used for executing the method embodiments of the present disclosure. For details that are not disclosed in the apparatus embodiments of the present disclosure, please refer to the method embodiments of the present disclosure.

Figure 14:
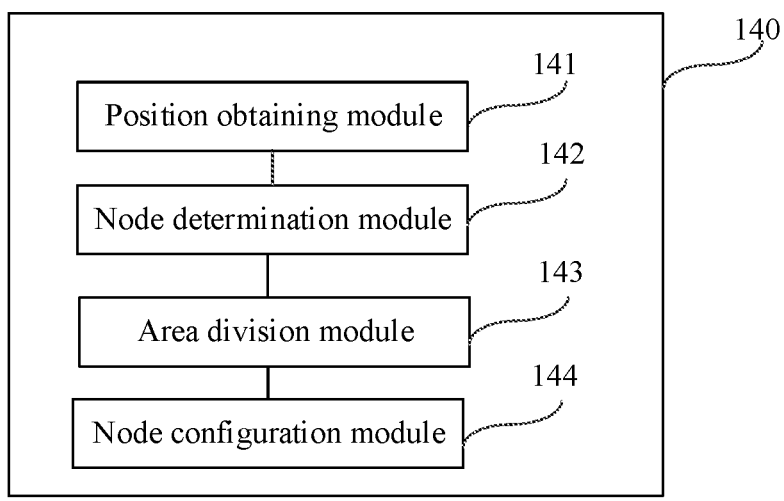
FIG. 14 is a block diagram of an object management apparatus according to an embodiment of the present disclosure.

With reference to FIG. 14, FIG. 14 illustrates a flowchart of an object management apparatus according to an embodiment of the present disclosure. The apparatus has functions of implementing the object management method. The functions may be implemented by hardware, or may be implemented by hardware executing corresponding software. The apparatus 140 may include: a position obtaining module 141, a node determining module 142, an area division module 143, and a node configuration module 144.

The position obtaining module 141 is configured to obtain position information of a first object added in a scene.

The node determining module 142 is configured to determine, from the object management tree corresponding to the scene, a first node according to the position information of the first object. The object management tree includes a plurality of nodes, each node corresponds to an area in the scene, areas corresponding to different nodes skip overlapping each other, and the first node refers to a node corresponding to an area to which the position information of the first object belongs.

The area division module 143 is configured to divide, in response to that a quantity of objects contained in the area corresponding to the first node is greater than an upper limit after the first object is added to the area corresponding to the first node, the area corresponding to the first node into n sub-areas according to the position information of the objects contained in the area corresponding to the first node, n being an integer greater than 1; the quantity of objects contained in the sub-areas being the same or close.

The node configuration module 144 is configured to configure, in the object management tree, n nodes in one-to-one correspondence with the n sub-areas.

Figure 15:
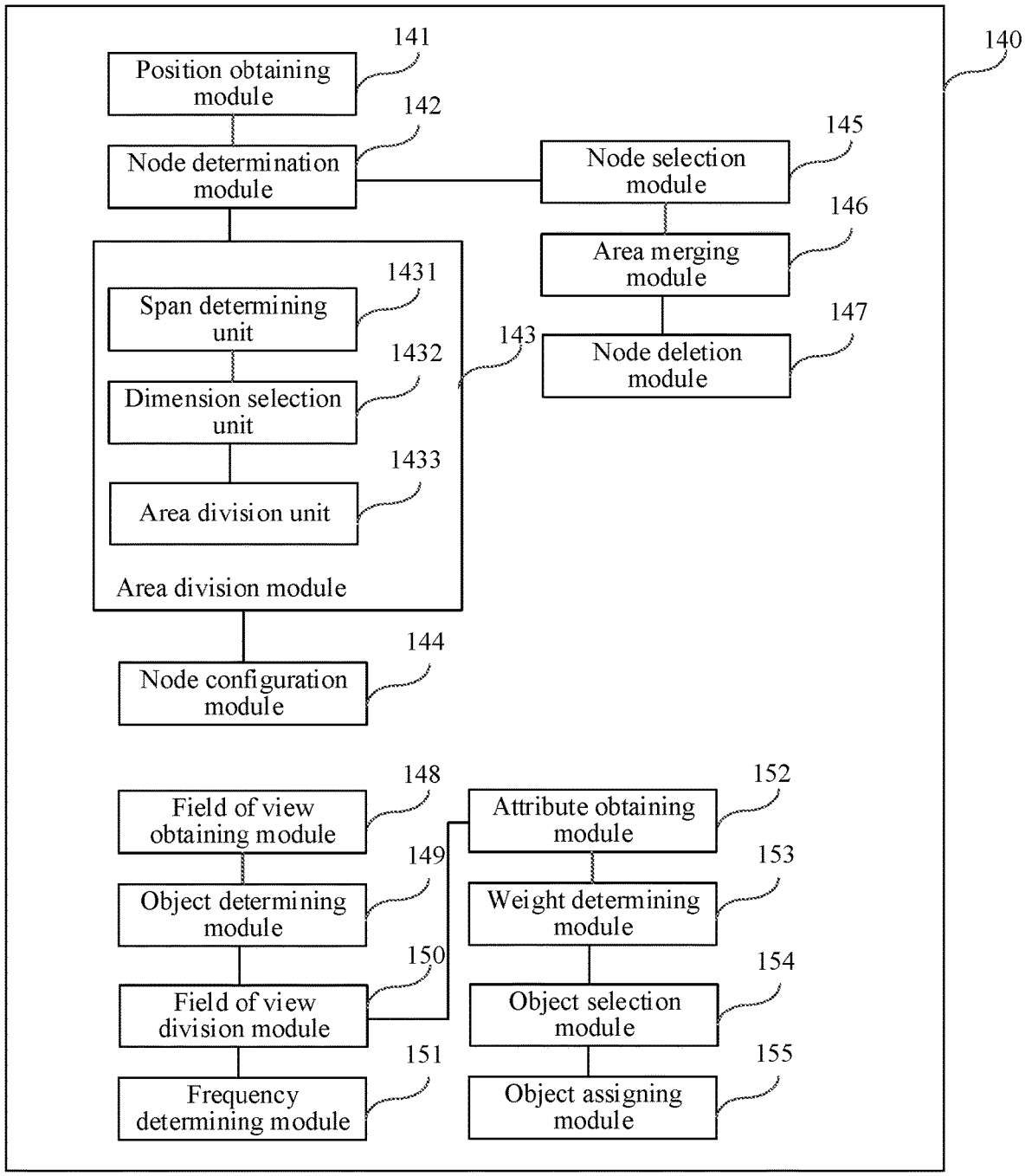
FIG. 15 is a block diagram of an object management apparatus according to another embodiment of the present disclosure.

In some embodiments, as shown in FIG. 15, the area division module 143 includes: a span determining unit 1431, a dimension selection unit 1432, and an area division unit 1433.

The span determining unit 1431 is configured to determine distance spans of the objects contained in the area corresponding to the first node in k spatial dimensions according to the position information of the objects contained in the area corresponding to the first node, k being a positive integer.

The dimension selection unit 1432 is configured to select, from among the k spatial dimensions, a target spatial dimension having the largest distance span.

The area division unit 1433 is configured to divide the area corresponding to the first node into n sub-areas by taking the target spatial dimension as a division reference.

In some embodiments, the area division unit 1433 is configured to determine a first object and a second object that are farthest apart in the target spatial dimension from among the object contained in the area corresponding to the first node; divide a line segment between two projection points of the first object and the second object in the target spatial dimension into n equal parts, to obtain n-1 split points; and divide the area corresponding to the first node into the n sub-areas based on the n-1 split points.

In some embodiments, the node configuration module 144 is configured to obtain the quantity of child nodes of a parent node of the first node; in response to that the quantity of the child nodes satisfies a first condition, add n-1 sibling nodes of the first node in the object management tree, and configure the first node and the n-1 sibling nodes to be in one-to-one correspondence with the n sub-areas; and in response to that the quantity of the child nodes satisfies a second condition, add n child nodes of the first node in the object management tree, and configure the n child nodes to be in one-to-one correspondence with the n sub-areas.

In some embodiments, the node configuration module 144 is further configured to, in response to that the quantity of the child nodes satisfies a third condition, add $n_1$ sibling nodes of the first node in the object management tree, add $n_2$ child nodes of the first node in the object management tree, and configure the $n_1$ sibling nodes and the $n_2$ child nodes to be in one-to-one correspondence with the n sub-areas, $n_1$ and $n_2$ being positive integers, and $n_1+n_2$ being equal to n.

In some embodiments, as shown in FIG. 15, the apparatus 140 further includes: a node selection module 145, an area merging module 146, and a node deletion module 147.

The position obtaining module 141 is further configured to obtain position information of a second object reduced from a scene.

The node determining module 142 is further configured to determine, from the object management tree, a second node based on the position information of the second object, the second node referring to a node corresponding to an area to which the position information of the second object belongs.

The node selection module 145 is configured to determine a third node merged with the second node from the object management tree in response to that a quantity of objects contained in the area corresponding to the second node is less than a lower limit after the second object is removed from the area corresponding to the second node.

The area merging module 146 is configured to update the area corresponding to the third node to a merged area containing an original area corresponding to the third node and the area corresponding to the second node.

The node deletion module 147 is configured to delete the second node from the object management tree.

In some embodiments, the area merging module 146 is configured to:
update the area corresponding to the third node to a merged area of the original area corresponding to the third node and a complete area corresponding to the second node when a quantity of third node is one;
or,
divide the area corresponding to the second node into k sub-areas when the quantity of third node is k, the k third nodes matching the k sub-areas in a one-to-one manner; and update, for each of the k third nodes, the area corresponding to the third node to a merged area of the original area corresponding to the third node and a sub-area matching the third node among the k third nodes, k being an integer greater than 1.

In some embodiments, the node deletion module 147 is further configure to delete, in response to that a parent node of the third node has one and only one child node, the parent node of the third node from the object management tree, and take the third node as a child node of a grandparent node thereof.

In some embodiments, as shown in FIG. 15, the apparatus 140 further includes: a field of view obtaining module 148, an object determining module 149, a field of view division module 150, and a frequency determining module 151.

The field of view obtaining module 148 is configured to obtain a field of view of a target object in the scene.

The object determining module 149 is configured to determine, based on the object management tree, a set of objects located within the field of view, the set of objects including at least one object within the field of view.

The field of view division module 150 is configured to divide the field of view into a plurality of sub fields of view; distances between different sub fields of view and the target object being different.

The frequency determining module 151 is configured to determine, according to the sub field of view to which each object in the set of objects belongs, a refresh frequency corresponding to each object; the refresh frequency corresponding to the object being negatively correlated with the distance between the sub field of view to which the object belongs and the target object.

In some embodiments, as shown in FIG. 15, the apparatus 140 further includes: an attribute obtaining module 152, a weight determining module 153, and an object selection module 154.

The attribute obtaining module 152 is configured to obtain, for a first sub field of view among the plurality of sub fields of view, attribute information respectively corresponding to objects within the first sub field of view in response to that the quantity of the objects within the first sub field of view is greater than a rated maximum quantity corresponding to the first sub field of view, the attribute information being used for characterizing a relationship between the objects and the target object.

The weight determining module 153 is configured to determine, according to the attribute information respectively corresponding to the objects within the first sub field of view, weights respectively corresponding to the objects within the first sub field of view.

The object selection module 154 is configured to select, among the objects within the first sub field of view, an object of which the weight satisfies a condition as a display object within the first sub field of view, the display object referring to an object displayed within the field of view of the target object.

In some embodiments, as shown in FIG. 15, the apparatus 140 further includes: an object assigning module 155.

The object assigning module 155 is configured to assign, for a second sub field of view among the plurality of sub fields of view, a redundant object within the first sub field of view to the second sub field of view in response to that the quantity of objects within the second sub field of view is less than a rated maximum quantity corresponding to the second sub field of view. The redundant object refers to an object, within the first sub field of view, of which the weight does not satisfy the condition, and the redundant object is displayed according to a refresh frequency corresponding to the second sub field of view.

In a technical solution provided in an embodiment of the present disclosure, when excessive objects are present in a certain area of the scene and need to be split, the area is divided into a plurality of sub-areas according to the distribution position of objects contained in the area, and the quantity of objects contained in the sub-areas is as equal as possible. That is, the space sizes of the sub-areas are not the same, but the quantity of the objects managed in the sub-areas is relatively uniform, so that the quantity of nodes can be prevented from increasing too quickly, internal memory occupation is reduced, and the quantity of objects managed in a certain area may be directly divided into n equal parts to improve the efficiency of object management.

The term module (and other similar terms such as sub-module, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 16:
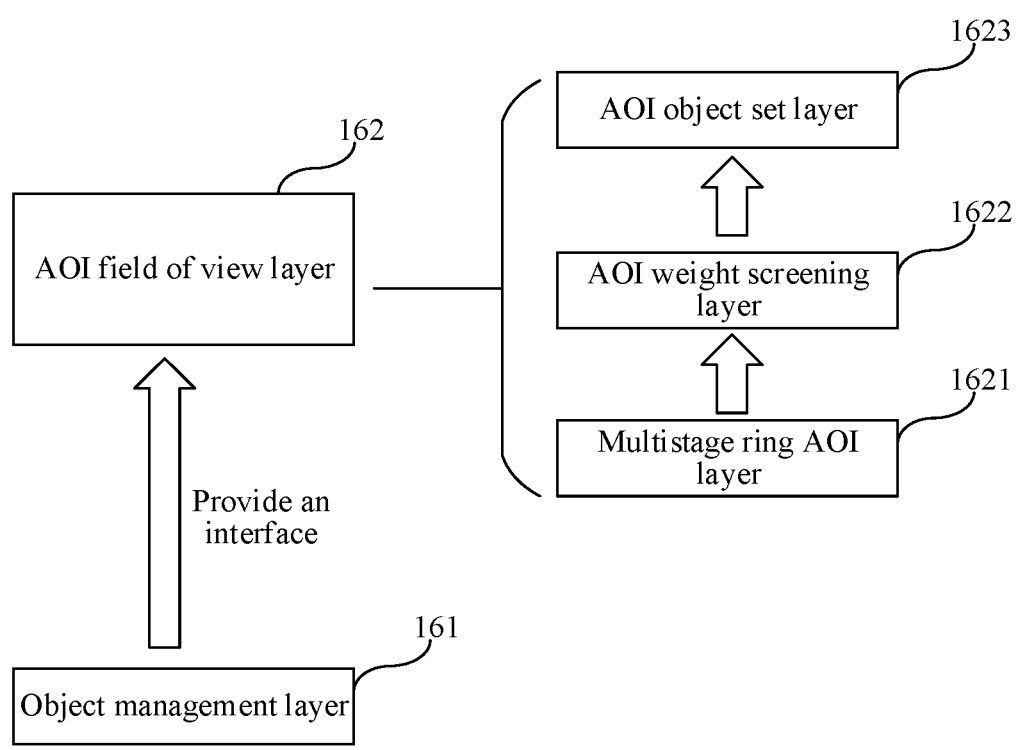
FIG. 16 is a block diagram of an object management system according to an embodiment of the present disclosure.

In some embodiments, as shown in FIG. 16, an object management system is provided in the present disclosure and includes: an object management layer 161 and an AOI field of view layer 162.

The AOI field of view layer 162 is configured to transmit field of view data of a target object in a scene to the object management layer 161, the field of view data of the target object being used for indicating a field of view of the target object.

The object management layer 161 is configured to determine the field of view of the target object based on the field of view data of the target object; determine, based on an object management tree corresponding to the scene, a set of objects located within the field of view of the target object, the set of objects including at least one object within the field of view of the target object, the object management tree including a plurality of nodes, each node corresponding to an area in the scene, areas corresponding to different nodes skipping overlapping each other, and the quantity of objects contained in the areas corresponding to the different nodes being the same or close; and transmit object set data to the AOI field of view layer 162, the object set data being used for indicating the set of objects within the field of view of the target object.

The AOI field of view layer 162 is configured to determine the set of objects within the field of view of the target object according to the object set data.

In the embodiment of the present disclosure, the object management layer 161 and the AOI field of view layer 162 may be taken as two mutually independent functional modules. The object management layer 161 is mainly responsible for managing objects in the scene by using an object management tree, and the AOI field of view layer 162 is mainly responsible for obtaining objects within a field of view and providing a client with related data of the objects within the field of view. The object management layer 161 may provide an interface to the AOI field of view layer 162. When needing to obtain object set data within the field of view of a target object, the AOI field of view layer 162 calls the interface and transmits field of view data of the target object to the object management layer 161, and the object management layer 161 obtains the object set data within the field of view of the target object and feeds back same to the AOI field of view layer 162.

In some embodiments, the AOI field of view layer 162 is further configured to:
  divide the field of view of the target object into a plurality of sub fields of view; distances between different sub fields of view and the target object being different; and
  determine, according to the sub field of view to which each object in the set of objects belongs, a refresh frequency corresponding to each object; the refresh frequency corresponding to the object being negatively correlated with the distance between the sub field of view to which the object belongs and the target object.

In some embodiments, the AOI field of view layer 162 is further configured to:

obtain, for a first sub field of view among the plurality of sub fields of view, attribute information respectively corresponding to objects within the first sub field of view in response to that the quantity of the objects within the first sub field of view is greater than a rated maximum quantity corresponding to the first sub field of view, the attribute information being used for characterizing a relationship between the objects and the target object;

determine, according to the attribute information respectively corresponding to the objects within the first sub field of view, weights respectively corresponding to the objects within the first sub field of view; and select, from among the objects within the first sub field of view, an object of which the weight satisfies a condition as a display object within the first sub field of view, the display object referring to an object displayed within the field of view of the target object.

In some embodiments, the object management layer 161 is further configured to:

obtain position information of a first object added in a scene;

determine, from the object management tree, a first node based on the position information of the first object; the first node referring to a node corresponding to an area to which the position information of the first object belongs;

divide, in response to that a quantity of objects contained in the area corresponding to the first node is greater than an upper limit after the first object is added to the area corresponding to the first node, the area corresponding to the first node into n sub-areas according to position information of the objects contained in the area corresponding to the first node, n being an integer greater than 1; the quantity of objects contained in the sub-areas being the same or close; and configure, in the object management tree, n nodes in one-to-one correspondence with the n sub-areas.

In some embodiments, the object management layer 161 is further configured to:

obtain position information of a second object reduced from the scene;

determine, from the object management tree, a second node based on the position information of the second object, the second node referring to a node corresponding to an area to which the position information of the second object belongs;

determine a third node merged with the second node from the object management tree in response to that a quantity of objects contained in the area corresponding to the second node is less than a lower limit after the second object is removed from the area corresponding to the second node;

update the area corresponding to the third node to a merged area of an original area corresponding to the third node and the area corresponding to the second node; and delete the second node from the object management tree.

In some embodiments, as shown in FIG. 16, the AOI field of view layer 162 may include a multistage ring AOI layer 1621, an AOI weight screening layer 1622, and an AOI object set layer 1623. The multistage ring AOI layer 1621 is mainly responsible for docking the object management layer 161, obtaining the set of objects within the field of view from the object management layer 161, and dividing the field of view into sub fields of view. For example, the multistage ring AOI layer 1621 is configured to obtain, from the object management layer 161, the object set data within the field of view of the target object, and determine the set of objects within the field of view of the target object according to the object set data. Further, the multistage ring AOI layer 1621 is configured to divide the field of view of the target object into a plurality of sub fields of view; and determine, according to the sub field of view to which each object in the set of objects belongs, a refresh frequency corresponding to each object. The AOI weight screening layer 1622 is mainly responsible for weight calculation and screening of objects. For example, the AOI weight screening layer 1622 is configured to obtain the attribute information respectively corresponding to the objects within the first sub field of view, determine, according to the attribute information respectively corresponding to the objects within the first sub field of view, weights respectively corresponding to the objects within the first sub field of view, and select, from among the objects within the first sub field of view, an object of which the weight satisfies a condition as a display object within the first sub field of view. The AOI object set layer 1623 is mainly responsible for docking the client, and providing finalized object set data to the client. Certainly, the foregoing division of functional levels of the AOI field of view layer 162 is only exemplary, and the level division can be flexibly set. This is not limited in the present disclosure.

In addition, for details not detailed in the system embodiments, please refer to the method embodiments above.

In a technical solution provided in an embodiment of the present disclosure, by decoupling the field of view update and the object management at a system level, the AOI field of view layer is responsible for the field of view update, and the object management layer is responsible for the object management. The two functional layers can be used separately or in combination, and the system is highly abstract and portable.

Figure 17:
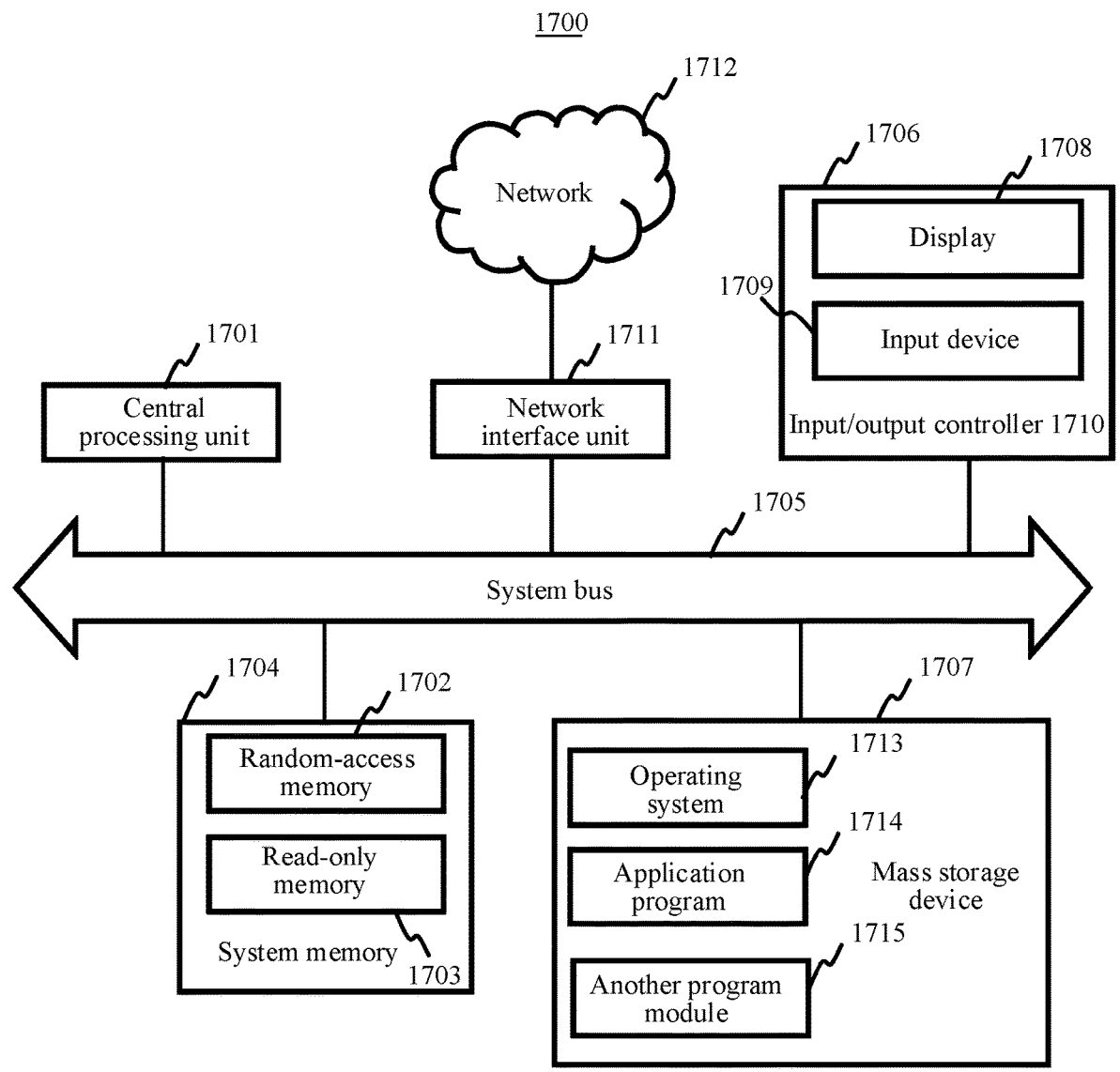
FIG. 17 is a schematic structural diagram of a computer device according to an embodiment of the present disclosure.

With reference to FIG. 17, FIG. 17 illustrates a schematic structural diagram of a computer device according to an embodiment of the present disclosure. The computer device may be any electronic device having data computing, processing, and storage functions, such as the terminal device or server described above, configured to implement the object management method provided in the embodiments. Specifically, the computer device 1700 includes a processing unit (such as a central processing unit (CPU), a graphics processing unit (GPU), and a field programmable gate array (FPGA)) 1701, a system memory 1704 including a random-access memory (RAM) 1702 and a read-only memory (ROM) 1703, and a system bus 1705 connecting the system memory 1704 and the central processing unit 1701. The computer device 1700 further includes a basic input/output system (I/O system) 1706 assisting in transmitting information between components in the server, and a mass storage device 1707 configured to store an operating system 1713, an application program 1714, and other program module 1715.

The basic I/O system 1706 includes a display 1708 configured to display information and an input device 1709, such as a mouse or a keyboard, configured to input information for a user. The display 1708 and the input device 1709 are both connected to the central processing unit 1701 by using an input/output controller 1710 connected to the system bus 1705. The basic input/output system 1706 may further include the input/output controller 1710 to be configured to receive and process inputs from a plurality of other devices such as a keyboard, a mouse, and an electronic stylus. Similarly, the input/output controller 1710 further provides an output to a display screen, a printer, or other type of output device.

The mass storage device 1707 is connected to the central processing unit 1701 by using a mass storage controller (not shown) connected to the system bus 1705. The mass storage device 1707 and a computer-readable medium associated with the mass storage device provide non-volatile storage to the computer device 1700. That is to say, the mass storage device 1707 may include a computer-readable medium (not shown) such as a hard disk or a compact disc read-only memory (CD-ROM) drive.

Generally, the computer-readable medium may include a computer storage medium and a communication medium. The computer storage medium includes volatile and non-volatile, and removable and non-removable media that used for storing information such as computer-readable instructions, data structures, program modules, or other data and that are implemented by using any method or technology. The computer storage medium includes a RAM, a ROM, an erasable programmable read-only memory (EPROM), an electrically erasable programmable read-only memory (EEPROM), a flash memory or other solid-state memory technology, a CD-ROM, a digital versatile disc (DVD) or other optical storage, a tape cartridge, a tape, a magnetic disk storage, or other magnetic storage devices. Certainly, a person skilled in art may know that the computer storage medium is not limited to the foregoing several types. The system memory 1704 and the mass storage device 1707 may be collectively referred to as memory.

According to the embodiment of the present disclosure, the computer device 1700 may further be connected, through a network such as the Internet, to a remote computer on the network to run. That is, the computer device 1700 may be connected to a network 1712 by using a network interface unit 1711 connected to the system bus 1705, or may be connected to other types of networks or remote computer systems (not shown) by using the network interface unit 1711.

The memory further includes a computer program. The computer program is stored in the memory and configured to be executed by one or more processors, so as to implement the object management method.

In an exemplary embodiment, further provided is a computer-readable storage medium, the computer-readable storage medium storing a computer program, and the computer program implementing the object management method when being executed by a processor of the computer device.

In some embodiments, the computer-readable storage medium may include: a read-only memory (ROM), a random-access memory (RAM), a solid state drive (SSD), an optical disc, or the like. The random access memory may include a resistance random access memory (ReRAM) and a dynamic random access memory (DRAM).

In an exemplary embodiment, further provided is a computer program product, the computer program product including a computer program, and the computer program being stored in a computer-readable storage medium. The processor of the computer device reads the computer program from the computer-readable storage medium, and the processor executes the computer program, so that the computer device executes the object management method.

It is to be understood that "a plurality of" mentioned herein means two or more. "And/or" describes an association relationship of associated objects and represents that there may be three relationships. For example, A and/or B may represent: only A, both A and B, and only B. The character "/" generally indicates an "or" relationship between the contextually associated objects. In addition, the step numbers described herein merely exemplarily show a possible execution sequence of the steps. In some other embodiments, the steps may not be performed according to the sequence of the numbers. For example, two steps with different numbers may be performed simultaneously, or two steps with different numbers may be performed according to a sequence contrary to the sequence shown in the drawings. This is not limited in the embodiments of the present disclosure.

The foregoing is merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An object management method, executed by a computer device and comprising:
    obtaining position information of a first object added in a scene in a game, wherein virtual objects in the scene of the game are managed based on an object management tree in a memory coupled to the computer device;
    determining, from the object management tree corresponding to the scene, a first node according to the position information of the first object, wherein the object management tree comprises a plurality of nodes, each node corresponding to an area in the scene, areas corresponding to different nodes do not overlap, and the first node corresponds to a first area to which the position information of the first object belongs;
    dividing, in response to that a quantity of objects contained in the first area corresponding to the first node is greater than an upper limit after the first object is added to the first area corresponding to the first node, the first area corresponding to the first node into n sub-areas according to position information of objects contained in the first area corresponding to the first node, n being an integer greater than 1; and
    configuring, in the object management tree, n nodes in one-to-one correspondence with the n sub-areas, comprising:
        obtaining a quantity of child nodes of a parent node of the first node;
        in response to that a sum of the quantity of the child nodes and n-1 is less than or equal to a first threshold, adding n-1 sibling nodes of the first node to the object management tree, and configuring the first node and the n-1 sibling nodes to be in one-to-one correspondence with the n sub-areas, wherein the first node is updated to correspond to a first sub-area in the n sub-areas, and a size of the first sub-area being different from a size of a second sub-area in the n sub-areas.

2. The method according to claim 1, wherein the dividing the first area corresponding to the first node into n sub-areas according to position information of objects contained in the first area corresponding to the first node comprises:
    determining distance spans of the objects contained in the first area corresponding to the first node in k spatial dimensions according to the position information of the objects contained in the first area corresponding to the first node, k being a positive integer;
    selecting, among the k spatial dimensions, a target spatial dimension having the largest distance span; and dividing the first area corresponding to the first node into the n sub-areas by taking the target spatial dimension as a division reference.

3. The method according to claim 2, wherein the dividing the first area corresponding to the first node into the n sub-areas by taking the target spatial dimension as a division reference comprises:
   determining a first object and a second object that are farthest apart in the target spatial dimension from the objects contained in the first area corresponding to the first node;
   dividing a line segment between two projection points of the first object and the second object in the target spatial dimension into n equal parts to obtain n-1 split points; and
   dividing the first area corresponding to the first node into the n sub-areas based on the n-1 split points.

4. The method according to claim 1, wherein the configuring, in the object management tree, n nodes in one-to-one correspondence with the n sub-areas comprises:
   in response to that the quantity of the child nodes equals the first threshold, adding n child nodes of the first node to the object management tree, and configuring the n child nodes to be in one-to-one correspondence with the n sub-areas.

5. The method according to claim 1, wherein the method further comprises:
   in response to that the quantity of the child nodes is less than the first threshold and the sum of the quantity of the child nodes and n-1 is greater than the first threshold, adding n1 sibling nodes of the first node to the object management tree, adding n2 child nodes of the first node to the object management tree, and configuring the n1 sibling nodes and the n2 child nodes to be in one-to-one correspondence with the n sub-areas, n1 and n2 being positive integers, and n1+n2 being equal to n.

6. The method according to claim 1, wherein the method further comprises:
   obtaining position information of a second object removed from the scene;
   determining, from the object management tree, a second node according to the position information of the second object, the second node corresponding to a second area to which the position information of the second object belongs;
   determining a third node merged with the second node from the object management tree in response to that a quantity of objects contained in the second area corresponding to the second node is less than a lower limit after the second object is removed from the second area corresponding to the second node;
   updating a third area corresponding to the third node to a merged area containing an original area corresponding to the third node and the second area corresponding to the second node; and
   deleting the second node from the object management tree.

7. The method according to claim 6, wherein the updating a third area corresponding to the third node to a merged area containing an original area corresponding to the third node and the second area corresponding to the second node comprises:
   updating the third area corresponding to the third node to the merged area containing the original area corresponding to the third node and the complete second area corresponding to the second node when a quantity of third node is one; and
   dividing the second area corresponding to the second node into k sub-areas when the quantity of third node is k, the k third nodes matching the k sub-areas in a one-to-one manner; and updating, for each of the k third nodes, the third area corresponding to the third node to the merged area containing the original area corresponding to the third node and a sub-area matching the third node among the k sub-areas, k being an integer greater than 1.

8. The method according to claim 6, wherein the method further comprises:
   deleting, in response to that a parent node of the third node has one and only one child node, the parent node of the third node from the object management tree, and taking the third node as a child node of a grandparent node thereof.

9. The method according to claim 1, wherein the method further comprises:
   obtaining a field of view of a target object in the scene;
   determining, based on the object management tree, a set of objects located within the field of view, the set of objects comprising at least one object within the field of view;
   dividing the field of view into a plurality of sub fields of view; distances between different sub fields of view and the target object being different; and
   determining, according to the sub field of view to which an object in the set of objects belongs, a refresh frequency corresponding to the object; the refresh frequency corresponding to the object being negatively correlated with the distance between the sub field of view to which the object belongs and the target object, wherein the refresh frequency of the object refers to an update frequency of real-time information of the object, the real-time information of the object including at least the position information of the object.

10. The method according to claim 9, wherein the method further comprises:
    obtaining, for a first sub field of view among the plurality of sub fields of view, attribute information respectively corresponding to objects within the first sub field of view in response to that the quantity of the objects within the first sub field of view is greater than a rated maximum quantity corresponding to the first sub field of view, the attribute information being used for characterizing a relationship between the objects and the target object;
    determining, according to the attribute information respectively corresponding to the objects within the first sub field of view, weights respectively corresponding to the objects within the first sub field of view; and
    selecting, among the objects within the first sub field of view, an object of which the weight satisfies a condition as a display object within the first sub field of view, the display object referring to an object displayed within the field of view of the target object.

11. The method according to claim 10, wherein the method further comprises:
    assigning, for a second sub field of view among the plurality of sub fields of view, a redundant object within the first sub field of view to the second sub field of view in response to that the quantity of objects within the second sub field of view is less than a rated maximum quantity corresponding to the second sub field of view;

the redundant object referring to an object within the first sub field of view and having a weight that does not satisfy the condition, and the redundant object being displayed according to a refresh frequency corresponding to the second sub field of view.

12. An object management apparatus, comprising:
at least one processor and at least one memory, the at least one memory storing a computer program, and the computer program being loaded and executed by the at least one processor to implement:
obtaining position information of a first object added in a scene in a game, wherein virtual objects in the scene of the game are managed based on an object management tree in the at least one memory;
determining, from the object management tree corresponding to the scene, a first node according to the position information of the first object, wherein the object management tree comprises a plurality of nodes, each node corresponding to an area in the scene, areas corresponding to different nodes do not overlap, and the first node corresponds to a first area to which the position information of the first object belongs;
dividing, in response to that a quantity of objects contained in the first area corresponding to the first node is greater than an upper limit after the first object is added to the first area corresponding to the first node, the first area corresponding to the first node into n sub-areas according to position information of objects contained in the first area corresponding to the first node, n being an integer greater than 1; and
configuring, in the object management tree, n nodes in one-to-one correspondence with the n sub-areas, comprising:
obtaining a quantity of child nodes of a parent node of the first node;
in response to that a sum of the quantity of the child nodes and n-1 is less than or equal to a first threshold, adding n-1 sibling nodes of the first node to the object management tree, and configuring the first node and the n-1 sibling nodes to be in one-to-one correspondence with the n sub-areas, wherein the first node is updated to correspond to a first sub-area in the n sub-areas, and a size of the first sub-area being different from a size of a second sub-area in the n sub-areas.

13. The apparatus according to claim 12, wherein the dividing the first area corresponding to the first node into n sub-areas according to position information of objects contained in the first area corresponding to the first node comprises:
determining distance spans of the objects contained in the first area corresponding to the first node in k spatial dimensions according to the position information of the objects contained in the first area corresponding to the first node, k being a positive integer;
selecting, among the k spatial dimensions, a target spatial dimension having the largest distance span; and
dividing the first area corresponding to the first node into the n sub-areas by taking the target spatial dimension as a division reference.

14. The apparatus according to claim 13, wherein the dividing the first area corresponding to the first node into the n sub-areas by taking the target spatial dimension as a division reference comprises:

determining a first object and a second object that are farthest apart in the target spatial dimension from the objects contained in the first area corresponding to the first node;
dividing a line segment between two projection points of the first object and the second object in the target spatial dimension into n equal parts to obtain n-1 split points; and
dividing the first area corresponding to the first node into the n sub-areas based on the n-1 split points.

15. The apparatus according to claim 12, wherein the configuring, in the object management tree, n nodes in one-to-one correspondence with the n sub-areas comprises:
in response to that the quantity of the child nodes equals the first threshold, adding n child nodes of the first node to the object management tree, and configuring the n child nodes to be in one-to-one correspondence with the n sub-areas.

16. The apparatus according to claim 12, wherein the at least one processor is further configured to perform:
in response to that the quantity of the child nodes is less than the first threshold and the sum of the quantity of the child nodes and n-1 is greater than the first threshold, adding n1 sibling nodes of the first node to the object management tree, adding n2 child nodes of the first node to the object management tree, and configuring the n1 sibling nodes and the n2 child nodes to be in one-to-one correspondence with the n sub-areas, n1 and n2 being positive integers, and n1+n2 being equal to n.

17. The apparatus according to claim 12, wherein the at least one processor is further configured to perform:
obtaining position information of a second object removed from the scene;
determining, from the object management tree, a second node according to the position information of the second object, the second node corresponding to a second area to which the position information of the second object belongs;
determining a third node merged with the second node from the object management tree in response to that a quantity of objects contained in the second area corresponding to the second node is less than a lower limit after the second object is removed from the second area corresponding to the second node;
updating a third area corresponding to the third node to a merged area containing an original area corresponding to the third node and the second area corresponding to the second node; and
deleting the second node from the object management tree.

18. The apparatus according to claim 17, wherein the updating a third area corresponding to the third node to a merged area containing an original area corresponding to the third node and the second area corresponding to the second node comprises:
updating the third area corresponding to the third node to the merged area containing the original area corresponding to the third node and the complete second area corresponding to the second node when a quantity of third node is one; and
dividing the second area corresponding to the second node into k sub-areas when the quantity of third node is k, the k third nodes matching the k sub-areas in a one-to-one manner; and updating, for each of the k third nodes, the third area corresponding to the third node to the merged area containing the original area corresponding to the third node and a sub-area matching the third node among the k sub-areas, k being an integer greater than 1.

19. The apparatus according to claim 17, wherein the at least one processor is further configured to perform:
deleting, in response to that a parent node of the third node has one and only one child node, the parent node of the third node from the object management tree, and taking the third node as a child node of a grandparent node thereof.

20. A non-transitory computer-readable storage medium, storing a computer program, the computer program being loaded and executed by at least one processor to implement:
obtaining position information of a first object added in a scene in a game, wherein virtual objects in the scene of the game are managed based on an object management tree in a memory coupled to the at least one processor;
determining, from the object management tree corresponding to the scene, a first node according to the position information of the first object, wherein the object management tree comprises a plurality of nodes, each node corresponding to an area in the scene, areas corresponding to different nodes do not overlap, and the first node corresponds to a first area to which the position information of the first object belongs;
dividing, in response to that a quantity of objects contained in the first area corresponding to the first node is greater than an upper limit after the first object is added to the first area corresponding to the first node, the first area corresponding to the first node into n sub-areas according to position information of objects contained in the first area corresponding to the first node, n being an integer greater than 1; and
configuring, in the object management tree, n nodes in one-to-one correspondence with the n sub-areas, comprising:
obtaining a quantity of child nodes of a parent node of the first node;
in response to that a sum of the quantity of the child nodes and n-1 is less than or equal to a first threshold, adding n-1 sibling nodes of the first node to the object management tree, and configuring the first node and the n-1 sibling nodes to be in one-to-one correspondence with the n sub-areas, wherein the first node is updated to correspond to a first sub-area in the n sub-areas, and a size of the first sub-area being different from a size of a second sub-area in the n sub-areas.

* * * * *